(12) United States Patent
Nishizawa

(10) Patent No.: US 9,784,976 B2
(45) Date of Patent: Oct. 10, 2017

(54) HEAD MOUNTED DISPLAY, INFORMATION PROCESSING APPARATUS, IMAGE DISPLAY APPARATUS, IMAGE DISPLAY SYSTEM, METHOD FOR SHARING DISPLAY OF HEAD MOUNTED DISPLAY, AND COMPUTER PROGRAM

(71) Applicant: Seiko Epson Corporation, Tokyo (JP)

(72) Inventor: Kazuo Nishizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/002,214

(22) Filed: Jan. 20, 2016

(65) Prior Publication Data

US 2016/0225189 A1     Aug. 4, 2016

(30) Foreign Application Priority Data

Feb. 4, 2015   (JP) ................................. 2015-019989
Dec. 7, 2015   (JP) ................................. 2015-238182

(51) Int. Cl.
| | |
|---|---|
| *G09G 5/00* | (2006.01) |
| *G02B 27/01* | (2006.01) |
| *G06F 3/01* | (2006.01) |
| *G06F 3/14* | (2006.01) |
| *G06F 3/147* | (2006.01) |
| *G09G 3/00* | (2006.01) |

(52) U.S. Cl.
CPC .......... *G02B 27/0172* (2013.01); *G06F 3/011* (2013.01); *G06F 3/147* (2013.01); *G06F 3/1454* (2013.01); *G02B 2027/014* (2013.01); *G02B 2027/0141* (2013.01); *G09G 3/002* (2013.01); *G09G 2358/00* (2013.01); *G09G 2370/022* (2013.01); *G09G 2370/04* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 2011/0061106 | A1 | 3/2011 | Kovacs et al. |
| 2013/0174213 | A1* | 7/2013 | Liu ...................... G02B 27/017 726/1 |
| 2014/0002496 | A1* | 1/2014 | Lamb ...................... G06F 3/14 345/633 |
| 2014/0285521 | A1* | 9/2014 | Kimura ................. G06T 19/006 345/633 |

FOREIGN PATENT DOCUMENTS

| | | |
|---|---|---|
| JP | 2008-299760 A | 12/2008 |
| JP | 2011-513821 A | 4/2011 |
| JP | 5074827 B | 11/2012 |

* cited by examiner

Primary Examiner — Martin Mushambo
(74) Attorney, Agent, or Firm — ALG Intellectual Property, LLC

(57) ABSTRACT

A head mounted display which enables a user to visually recognize a virtual image includes: an image display unit that causes the user to visually recognize the virtual image; a processing unit that processes display information, which is information displayed to the user as the virtual image, in the image display unit; and a transmission unit that transmits the processed display information to an image display apparatus which is connected to the head mounted display.

21 Claims, 22 Drawing Sheets

| INFORMATION TYPE | PROCESSING METHOD |
|---|---|
| E01 — STILL IMAGE | IMAGE FILTERING |
| E02 — MOVING IMAGE | RESOLUTION CHANGE |
| E03 — TEXT | REPLACEMENT TEXT |
| E04 — VIRTUAL OBJECT | SINGLE COLOR SILHOUETTE |
| E05 — SOUND | REPLACEMENT SOUND |
| E06 — THE OTHER | NON-DISPLAY |

FIG.9

| USER IDENTIFICATION INFORMATION | CURRENT LOCATION INFORMATION | DIRECTION INFORMATION | DISPLAY INFORMATION | TYPE OF INFORMATION |
|---|---|---|---|---|
| AAA | xxxxx | xxxxx | xxxxx | MOVING IMAGE |
| BBB | xxxxx | xxxxx | xxxxx | STILL IMAGE |
| CCC | xxxxx | xxxxx | xxxxx | VIRTUAL OBJECT |
| ... | ... | ... | ... | ... |

| LOCATION IDENTIFICATION INFORMATION | CURRENT LOCATION INFORMATION | DIRECTION INFORMATION | DISPLAY INFORMATION | TYPE OF INFORMATION | SCENE IMAGE |
|---|---|---|---|---|---|
| AAA | xxxxx | xxxxx | xxxxx | MOVING IMAGE | xxxxx |
| BBB | xxxxx | xxxxx | xxxxx | STILL IMAGE | xxxxx |
| CCC | xxxxx | xxxxx | xxxxx | VIRTUAL OBJECT | xxxxx |
| ... | ... | ... | ... | ... | ... |

| DELIVERY CONDITION | LOCATION INFORMATION | DIRECTION INFORMATION | DELIVERY INFORMATION | TYPE OF INFORMATION | ACTUAL OBJECT CONDITION |
|---|---|---|---|---|---|
| GENDER=MALE | xxxxx | xxxxx | xxxxx | STILL IMAGE | xxxxx |
| GENDER=FEMALE | xxxxx | xxxxx | xxxxx | STILL IMAGE | xxxxx |
| ... | ... | ... | ... | ... | ... |

E01 — GENDER=MALE row
E02 — GENDER=FEMALE row
326

HEAD MOUNTED DISPLAY, INFORMATION PROCESSING APPARATUS, IMAGE DISPLAY APPARATUS, IMAGE DISPLAY SYSTEM, METHOD FOR SHARING DISPLAY OF HEAD MOUNTED DISPLAY, AND COMPUTER PROGRAM

BACKGROUND

1. Technical Field

The present invention relates to a technology for sharing display of a head mounted display.

2. Related Art

A head mounted display which is used after being mounted on the head of a user and forms a virtual image in a visual field of the user (for example, refer to Japanese Patent No. 5074827) has been known. The head mounted display is also called an HMD. In such an HMD, various types of input sections, which are different from the input sections according to the related art, such as an input section using sounds and an input section using gestures are proposed based on the characteristics in that the HMD is used after being mounted on the head of the user.

The presence of the above-described various types of input sections improves the convenience of the HMD. In contrast, only the user of the HMD can view the virtual image of the HMD. Therefore, when viewed from the perspective of a third person, there is a case in which the third person does not find out what the user who manipulates the HMD is doing. As above, the HMD according to the related art has a problem in that there is a case in which an operation for manipulating the HMD (for example, gestures, sounds, or the like) is unnaturally reflected to the eyes of the third person. In technologies disclosed in Japanese Patent No. 5074827 and JP-T-2011-513821, such a problem is not taken into consideration.

SUMMARY

An advantage of some aspects of the invention is to reduce the artificiality of the operation for manipulating the head mounted display when viewed from the perspective of the third person.

The invention can be implemented as the following aspects.

(1) An aspect of the invention provides a head mounted display which enables a user to visually recognize a virtual image. The head mounted display includes: an image display unit that causes the user to visually recognize the virtual image; a processing unit that processes display information, which is information displayed to the user as the virtual image, in the image display unit; and a transmission unit that transmits the processed display information to an image display apparatus which is connected to the head mounted display.

In the head mounted display according to the aspect, the transmission unit transmits display information, which is information displayed to the user as a virtual image, to the image display apparatus which is connected to the head mounted display. The third person who views the display information displayed on the image display apparatus which receives the display information can perceive what the user of the head mounted display is viewing. As a result, even when the user of the head mounted display performs an operation (for example, gestures, utterances, or the like) for manipulating the head mounted display, the operation is unlikely to be artificially reflected in the eyes of the third person. That is, when viewed from the perspective of the third person, it is possible to reduce the artificiality of the operation for manipulating the head mounted display. Further, the display information, which is transmitted to and displayed on the image display apparatus by the transmission unit, is the processed display information. Therefore, the transmission unit can improve the security accompanying when the display information is released to the third person by, for example, performing a process of reducing the detail, the clarity and the like of the information in the display information, compared to the case of transmitting and displaying the display information to and on the image display apparatus without change.

(2) In the head mounted display according to the aspect, the processing unit may change a method of the process according to at least any one of a type of the display information and authority of the user of the image display apparatus.

In the head mounted display according to the aspect with this configuration, the processing unit can change the type of the processing of the display information according to at least any one of the type of the display information and the authority of the user (that is, third person) of the image display apparatus. When the processing method is changed according to the type of the display information, the processing unit can employ an optimal processing method for each information type, and can change the degree of release to the third person for each information type. When the processing method is changed according to the type of the authority of the user of the image display apparatus, the processing unit can change the degree of release to the user (that is, third person) for each image display apparatus according to the level of the authority.

(3) In the head mounted display according to the aspect, the transmission unit may broadcast-transmit the processed display information.

In the head mounted display according to the aspect with this configuration, the transmission unit can simply transmit and display the processed display information to and on an adjacent image display apparatus.

(4) Another aspect of the invention provides an image display apparatus which is connected to the head mounted display according to the aspect. The image display apparatus is another head mounted display which enables the user to visually recognize the virtual image. The another head mounted display includes a reception-side image display unit that causes the user to visually recognize the virtual image; a reception-side acquisition unit that acquires the processed display information from the head mounted display; and a reception-side augmented reality processing unit that forms the virtual image, which is used to cause the processed display information to be visually recognized, on the reception-side image display unit in the vicinity of the user of the head mounted display.

In the image display apparatus according to the aspect, it is possible to configure an image display apparatus which releases the display information to the third person as the head mounted display. In addition, the reception-side augmented reality processing unit causes the display information to be visually recognized in the vicinity of the user of the head mounted display in the visual field of the third person. Therefore, the third person can more intuitively associate and understand the user of the head mounted display with the information which is viewed by the user.

(5) Still another aspect of the invention provides an image display apparatus which is connected to the head mounted display according to the aspect. The image display apparatus is a projector that acquires the processed display information from the head mounted display and that projects an image including the processed display information.

In the image display apparatus according to the aspect, it is possible to configure an image display apparatus which releases the display information to the third person as the projector. Therefore, it is possible to collectively release the display information to a plurality of third persons.

(6) Yet another aspect of the invention provides an information processing apparatus. The information processing apparatus includes an acquisition unit that acquires display information which is information displayed to a user of a head mounted display as a virtual image in the head mounted display which is connected to the information processing apparatus; a processing unit that processes the acquired display information; and a transmission unit that transmits the processed display information to an image display apparatus which is connected to the information processing apparatus.

In the information processing apparatus according to the aspect, the transmission unit transmits display information, which is information displayed to the user of the head mounted display as a virtual image, to the image display apparatus which is connected to the information processing apparatus. The third person who views the display information displayed on the image display apparatus which receives the display information can perceive what the user of the head mounted display is viewing. As a result, even when the user of the head mounted display performs an operation (for example, gestures, utterances, or the like) for manipulating the head mounted display, the operation is unlikely to be artificially reflected in the eyes of the third person. That is, when viewed from the perspective of the third person, it is possible to reduce the artificiality of the operation for manipulating the head mounted display. Further, the display information, which is transmitted to and displayed on the image display apparatus by the transmission unit, is the processed display information. Therefore, the transmission unit can improve the security accompanying when the display information is released to the third person by, for example, performing a process of reducing the detail, the clarity and the like of the information in the display information, compared to the case of transmitting and displaying the display information to and on the image display apparatus without change.

(7) In the information processing apparatus according to the aspect, the processing unit may change a method of the process according to at least any one of a type of the display information and authority of the user of the image display apparatus.

In the information processing apparatus according to the aspect with this configuration, the processing unit can change the type of the processing of the display information according to at least any one of the type of the display information and the authority of the user (that is, third person) of the image display apparatus. When the processing method is changed according to the type of the display information, the processing unit can employ an optimal processing method for each information type, and can change the degree of release to the third person for each information type. When the processing method is changed according to the authority of the user of the image display apparatus, the processing unit can change the degree of release to the user (that is, third person) for the image display apparatus according to the level of the authority.

(8) The information processing apparatus according to the aspect may further include a storage unit that stores the display information which is acquired from each of a plurality of head mounted displays, and the acquisition unit may acquire first current location information that indicates a current location of the head mounted display, together with the display information, and may store the acquired display information and the first current location information in the storage unit after associating the acquired display information with the first current location information.

In the information processing apparatus according to the aspect with this configuration, it is possible to accumulate the display information acquired from a plurality of head mounted displays in the storage unit.

(9) In the information processing apparatus according to the aspect, the transmission unit may further acquire second current location information which indicates a current location of the image display apparatus from the image display apparatus, may acquire the display information in the head mounted display, which is present in a predetermined range of the image display apparatus, from the storage unit using the acquired second current location information and the first current location information in the storage unit, may cause the processing unit to process the acquired display information, and may transmit the processed display information to the image display apparatus.

In the information processing apparatus according to the aspect with this configuration, the transmission unit can automatically transmit and display the display information in the head mounted display included in a predetermined range of the image display apparatus, in other words, the display information in the head mounted display which is present in the vicinity of the image display apparatus to and on the image display apparatus using the first and second current location information.

(10) Still yet another aspect of the invention provides an image display apparatus, which is connected to the information processing apparatus according to the aspect. The image display apparatus is another head mounted display that enables the user to visually recognize the virtual image. The another head mounted display includes a reception-side image display unit that causes the user to visually recognize the virtual image; a reception-side acquisition unit that acquires the processed display information from the information processing apparatus; and a reception-side augmented reality processing unit that forms the virtual image, which is used to cause the processed display information to be visually recognized, on the reception-side image display unit in the vicinity of the user of the head mounted display.

In the image display apparatus according to the aspect, it is possible to configure the image display apparatus which releases the display information to the third person as the head mounted display. In addition, the reception-side augmented reality processing unit causes the display information to be visually recognized in the vicinity of the user of the head mounted display in the visual field of the third person. Therefore, the third person can more intuitively associate and understand the user of the head mounted display with the information which is viewed by the user.

(11) In the information processing apparatus according to the aspect, the acquisition unit may acquire a scene image, which includes the user of the head mounted display, together with the display information, the processing unit may further compose the acquired scene image with the processed display information, and the transmission unit may transmit the display information acquired after composition to the image display apparatus as the processed display information.

In the information processing apparatus according to the aspect with this configuration, the transmission unit transmits and displays the display information acquired by composing the scene image including the user of the head mounted display to and on the image display apparatus. Therefore, when an image display apparatus which releases the display information to the third person is, for example, a projector, a smart phone, or the like, the third person can more intuitively associate and understand the user of the head mounted display with the information which is viewed by the user.

(12) Further another aspect of the invention provides an image display apparatus which is connected to the information processing apparatus according to the aspect. The image display apparatus is a projector that acquires the processed display information from the information processing apparatus and that projects an image including the processed display information.

In the image display apparatus according to the aspect, it is possible to configure an image display apparatus which releases the display information to the third person as the projector. Therefore, it is possible to collectively release the display information to a plurality of third persons.

(13) Still further another aspect of the invention provides an information processing apparatus. The information processing apparatus includes a storage unit that stores delivery information to be delivered to an image display apparatus which is connected to the information processing apparatus; and a control unit that transmits the delivery information according to at least any one of information for the image display apparatus and information for a user of the image display apparatus to the image display apparatus.

In the information processing apparatus according to the aspect, the control unit transmits the delivery information according to at least one of the information for the image display apparatus and the information for the user of the image display apparatus to the image display apparatus using the delivery information which is stored in the storage unit in advance. When the delivery information is displayed on the image display apparatus which receives the delivery information, the user of the image display apparatus can visually recognize individual delivery information according to the information for the image display apparatus or the information for the user. As a result, in the information processing apparatus according to the aspect, it is possible to improve convenience for the user of the image display apparatus or an information provider who provides information to the third person using the information processing apparatus.

(14) In the information processing apparatus according to the aspect, the control unit may process the delivery information in the storage unit according to at least any one of the information, and may transmit the processed delivery information as the delivery information to the image display apparatus.

In the information processing apparatus according to the aspect with this configuration, the control unit processes the delivery information according to at least any one of information for the image display apparatus and the information for the user of the image display apparatus, and transmits the processed delivery information to the image display apparatus as "delivery information according to at least any one of information". Therefore, for example, it is possible to prepare a plurality of delivery information according to at least any one of information based on one piece of delivery information which is prepared in the storage unit in advance, and thus it is possible to reduce the memory capacity of the delivery information in the storage unit.

(15) In the information processing apparatus according to the aspect, the control unit further may broadcast transmit an information acquisition request for acquiring at least any one of the information from the specified communication carrier, and may transmit the delivery information to the image display apparatus which responds to the information acquisition request.

In the information processing apparatus according to the aspect with this configuration, the control unit broadcast-transmits the information acquisition request from the specified communication carrier, and thus it is possible to transmit the delivery information only between the information processing apparatus and the image display apparatus which is located in a specified place (that is, in a range in which communication from the specified communication carrier is possible).

(16) In the information processing apparatus according to the aspect, the control unit may acquire at least any one of the information by repeating transmission of the information acquisition request and reception of the response for the information acquisition request between the control unit and the image display apparatus which responds to the information acquisition request.

In the information processing apparatus according to the aspect with this configuration, the control unit can successively acquire the information for the image display apparatus and the information for the user of the image display apparatus. Therefore, the control unit can reduce the risk of information leakage when communicated content is leaked, compared to a case in which the information is acquired all at one time. In addition, in the information processing apparatus according to the aspect, it is possible to reduce each information amount which is exchanged between the information processing apparatus and the image display apparatus, and thus it is possible to reduce processing loads for the information processing apparatus and the image display apparatus.

(17) In the information processing apparatus according to the aspect, the information acquisition request may include information for identifying whether or not it is possible to refuse a response on a side of the image display apparatus.

In the information processing apparatus according to the aspect with this configuration, the control unit can separately distinguish an information acquisition request which can be refused to respond on the side of the image display apparatus from an information acquisition request which cannot be refused to respond on the side of the image display apparatus.

(18) Yet further another aspect of the invention provides an image display apparatus which is connected to the information processing apparatus according to the aspect. The image display apparatus is a head mounted display that enables the user to visually recognize the virtual image. The head mounted display includes a reception-side image display unit that causes the user to visually recognize the virtual image; a reception-side acquisition unit that acquires the delivery information from the information processing apparatus; and a reception-side augmented reality processing unit that forms the virtual image, which indicates the acquired delivery information, on the reception-side image display unit.

In the image display apparatus according to the aspect, it is possible to configure the image display apparatus for displaying the delivery information as the head mounted display.

(19) Still yet further another aspect of the invention provides an image display system. The image display system includes a head mounted display; an information processing apparatus; and another head mounted display. The information processing apparatus includes an acquisition unit that acquires display information which is information displayed to a user of the head mounted display as a virtual image in the head mounted display which is connected to the information processing apparatus; a processing unit that processes the acquired display information; and a transmission unit that transmits the processed display information to an image display apparatus which is connected to the information processing apparatus, and the another head mounted display includes a reception-side image display unit that causes the user to visually recognize the virtual image; a reception-side acquisition unit that acquires the processed display information from the information processing apparatus; and a reception-side augmented reality processing unit that forms the virtual image, which is used to cause the processed display information to be visually recognized, on the reception-side image display unit in the vicinity of the user of the head mounted display.

In the image display system according to the aspect, it is possible to reduce the artificiality of an operation for manipulating the head mounted display when viewed from the perspective of the eyes of the third person (that is, a user of another head mounted display).

(20) A further aspect of the invention provides an image display system. The image display system includes ahead mounted display; an information processing apparatus; and a projector. The information processing apparatus includes an acquisition unit that acquires display information which is information displayed to a user of the head mounted display as a virtual image in the head mounted display which is connected to the information processing apparatus; a processing unit that processes the acquired display information; and a transmission unit that transmits the processed display information to an image display apparatus which is connected to the information processing apparatus. The projector acquires the processed display information from the information processing apparatus, and may project an image including the processed display information.

In the image display system according to the aspect, it is possible to reduce the artificiality of the operation for manipulating the head mounted display when viewed from the perspective of the eyes of the third person (that is, a user of the projector).

(21) According to still further an aspect of the invention, there is provided an image display system. The image display system includes an information processing apparatus and a head mounted display. The information processing apparatus includes a storage unit that stores delivery information to be delivered to the head mounted display which is connected to the information processing apparatus; and a control unit that transmits the delivery information according to at least any one of information for the head mounted display and information for a user of the head mounted display to the head mounted display. The head mounted display includes a reception-side image display unit that causes the user to visually recognize the virtual image; a reception-side acquisition unit that acquires the delivery information from the information processing apparatus; and a reception-side augmented reality processing unit that forms the virtual image, which indicates the acquired delivery information, on the reception-side image display unit.

In the image display system according to the aspect, it is possible to improve convenience for the user of the image display apparatus or an information provider who provides information to the third person using the information processing apparatus.

All of the plurality of components which have the respective forms according to the above-described invention are not essential. In order to solve a part or the whole of the above-described problem, or in order to accomplish a part or the whole of the advantage described in the specification, it is possible to appropriately perform change, removal, replacement with new components, or partial removal of limited content on parts of components of the plurality of components. In addition, in order to solve a part or the whole of the above-described problem, or in order to accomplish a part or the whole of the advantage described in the specification, it is possible to combine a part or the whole of the technical characteristics included in a form according to the above-described invention with a part or the whole of the technical characteristics included in another form according to the above-described invention, and causes the combination to be an independent form according to the invention.

For example, it is possible to implement one form of the invention as an apparatus which includes a part or the whole of the components of the three components, that is, the image display unit, the processing unit, and the transmission unit. That is, the apparatus may or may not include the image display unit. In addition, the apparatus may or may not include the processing unit. In addition, the apparatus may or may not include the transmission unit. Although it is possible to implement the apparatus as, for example, the head mounted display, it is also possible to implement the apparatus as another apparatus other than the head mounted display. It is possible to apply either a part or the whole of the technical characteristics of each form of the above-described head mounted display to the apparatus. For example, an apparatus as one form of the invention has a problem to reduce the artificiality of an operation for manipulating the head mounted display when viewed from the perspective of the third person. However, in addition to this, reduction in size of the apparatus, improvement in convenience, cost reduction when manufacturing the apparatus, resource saving, easy manufacturing, and the like are required for the apparatus.

Meanwhile, the invention can be implemented in various modes. For example, it is possible to implement the invention in forms of a head mounted display, a head mounted display control method, and a system which includes the head mounted display, an information processing apparatus, an information processing apparatus control method, a system which includes the information processing apparatus, an image display apparatus, an image display apparatus control method, a system which includes the image display apparatus, a computer program for implementing the functions of the methods, the apparatuses, and the systems, a server apparatus which distributes the computer program, a recording medium which stores the computer program, and the like.

BRIEF DESCRIPTION OF THE DRAWINGS

The invention will be described with reference to the accompanying drawings, wherein like numbers reference like elements.

FIG. 9 is a diagram illustrating an example of user information.

FIG. 12 is a diagram illustrating an example of user information according to the second embodiment.

FIG. 14 is a diagram illustrating an example of delivery information.

DESCRIPTION OF EXEMPLARY EMBODIMENTS

A. First Embodiment

A-1. Configuration of Image Display System

Figure 1:
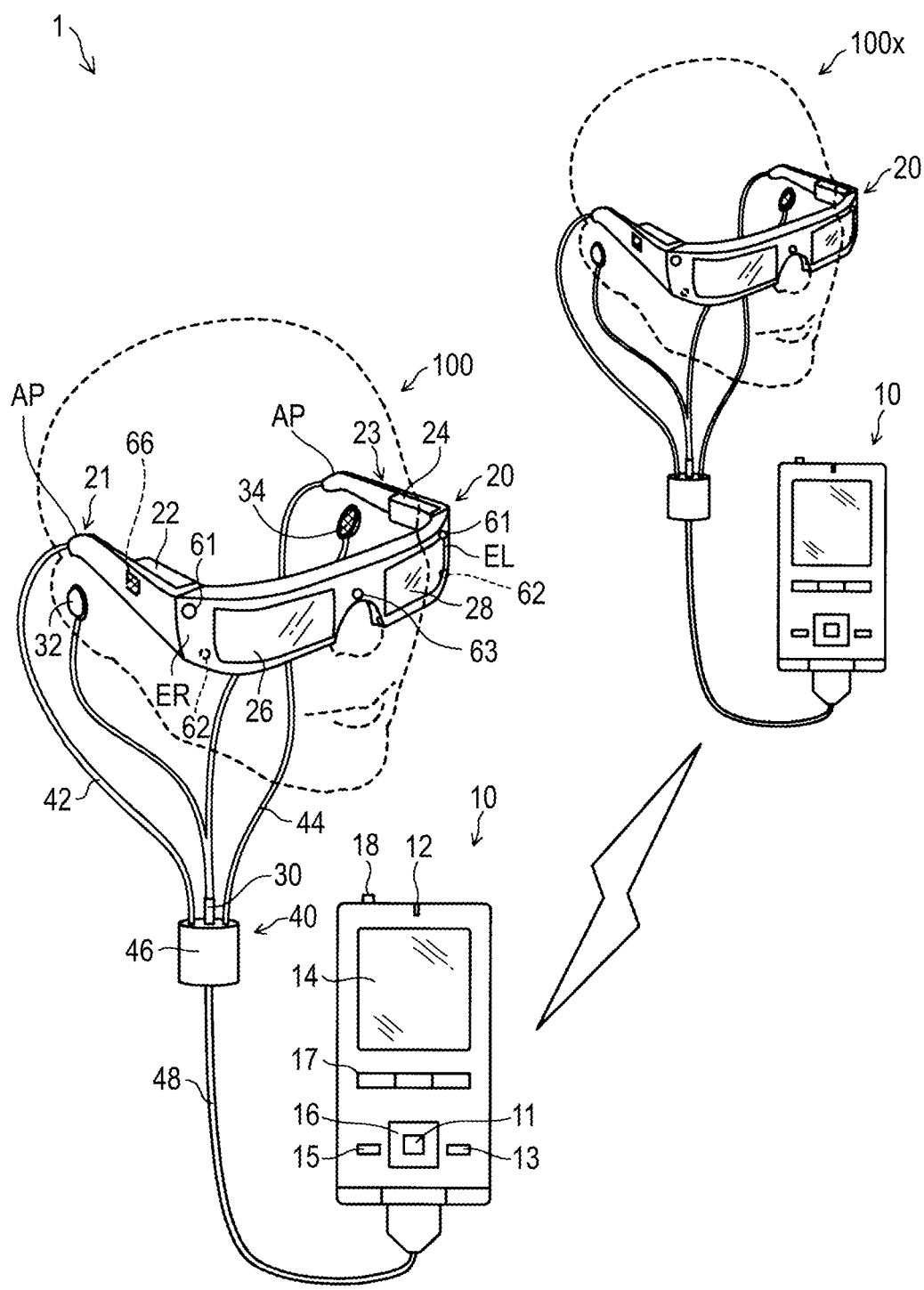
FIG. 1 is an explanatory diagram illustrating the schematic configuration of an image display system according to an embodiment of the invention.

FIG. 1 is an explanatory diagram illustrating the schematic configuration of an image display system according to an embodiment of the invention. An image display system 1 includes a head mounted display 100 and a head mounted display 100x. Both the head mounted displays 100 and 100x are display apparatuses mounted on the head, and are called a Head Mounted Display (HMD). Both the HMDs 100 and 100x are optical transmission-type head mounted displays which enable users to visually recognize a virtual image and at the same time visually recognize an outside view directly. The HMDs 100 and 100x are connected to each other by wireless communication through an access point apparatus which is not shown in the drawing.

In the embodiment, when a sharing process which will be described later is performed, it is possible to cause the user of the HMD 100x to visually recognize information (hereinafter, referred to as "display information") which is displayed to the user of the HMD 100 as a virtual image in the HMD 100 by displaying the information in the HMD 100x. It is possible to cause the display information to include various types of information. For example, informational a1 to a3, which will be described below as examples, may be included as the display information.

(a1) A virtual object which is displayed in an Augmented Reality (AR) process. Here, the "augmented reality process" is a process of adding information (virtual object) to an actual object, which is an object that is present in the real world, using the HMD 100. The actual object means an arbitrary person, an arbitrary animal or plant, an arbitrary article (an artifact, a natural object, or the like), and the like. The actual object includes both an actually interested object that is an object to which attention is paid (for example, eyes are turned) by the user, and an actual background object that is an object in which the user does not have interest (for example, an object which is included in a visual field but eyes are not turned). The "add" means all of the followings.

Addition of information to the actual object using the virtual object

Emphasis of the Actual Object Using the Virtual Object

Removal or attenuation of information (color, shape, or the like) possessed by the actual object using the virtual object Combination of arbitrary two or more of the above-described addition, emphasis, removal, and attenuation In the augmented reality process, an actual object may be or may not be associated with a virtual object which is additionally displayed together with the actual object.

(a2) Still images, moving images, text strings, and sound which are included in content which is being reproduced in HMD 100.

(a3) Still images, moving images, text strings, sound, and vibration which are provided by an application which is being executed in the in HMD 100. As above, in the embodiment, information, in which a mode "display", such as "sound" or "vibration" is not adopted, is conveniently called "display information".

Meanwhile, in the description below, the user of the HMD 100 is called a "user", and the user of the HMD 100x is called a "third person". That is, in the embodiment, when the sharing process which will be described later is performed, it is possible to release display information in the HMD 100 to a third person.

A-2. Configuration of HMD 100

Figure 2:
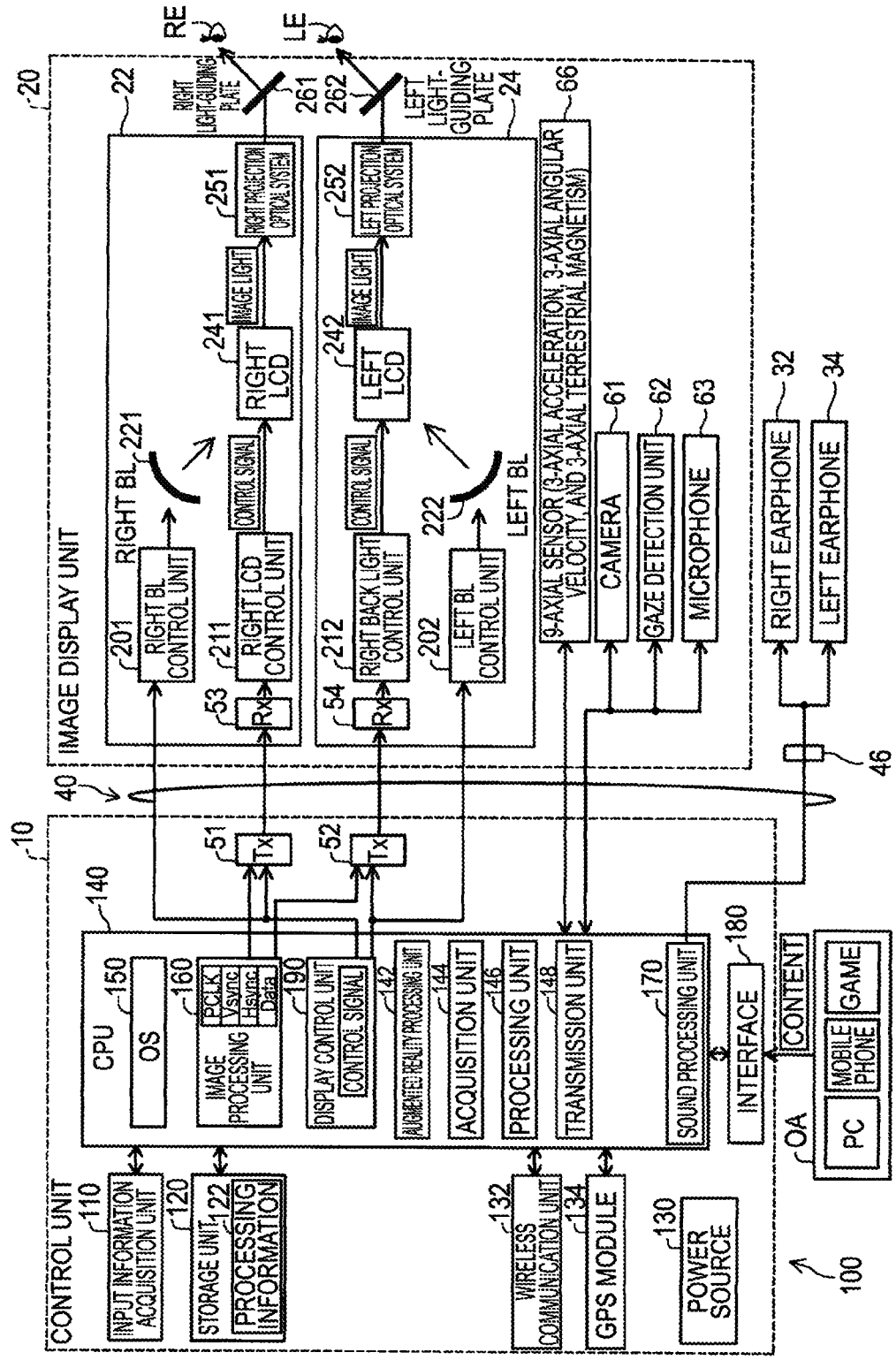
FIG. 2 is a block diagram functionally illustrating the configuration of an HMD.

A-2-1. Configuration of Image Display Unit:

FIG. 2 is a block diagram functionally illustrating the configuration of the HMD 100. Hereinafter, the configuration of the HMD 100 will be described with reference to FIGS. 1 and 2. An image display unit 20 is a wearing device which is mounted on the head of a user, and has the shape of glasses in the embodiment (FIG. 1). The image display unit 20 includes a right holding unit 21, a right display driving unit 22, a left holding unit 23, a left display driving unit 24, a right optical image display unit 26, a left optical image display unit 28, cameras 61, a gaze detection unit 62, a microphone 63, and a 9-axial sensor 66. Hereinafter, the locational relationship and functions of the respective units of the image display unit 20 in a state in which a user wears the image display unit 20 will be described.

As illustrated in FIG. 1, the right optical image display unit 26 and the left optical image display unit 28 are arranged to be respectively located in front of the right eye and the left eye of a user. One end of the right optical image display unit 26 and one end of the left optical image display unit 28 are connected to each other at a location corresponding to the middle of the forehead of the user. As illustrated in FIG. 2, the right optical image display unit 26 includes aright light-guiding plate 261 and a dimmer plate which is not shown in the drawing. The right light-guiding plate 261 is formed of a light transmitting resin material or the like, and leads image light, which is output from the right display driving unit 22, to the right eye RE of the user while reflecting the image light along a predetermined light path. The dimmer plate is a thin plate-shaped optical element, and is arranged to cover the surface side (side opposite to the side of the eye of the user) of the image display unit 20. The dimmer plate protects the light-guiding plate 261, and suppresses damage, adhesion of dirt, or the like. In addition, when the light transmittance of the dimmer plate is adjusted, it is possible to adjust the easiness of visual recognition of a virtual image by adjusting the quantity of external light which enters the eyes of the user. The dimmer plate may be omitted. The left optical image display unit 28 includes a left light-guiding plate 262 and a dimmer plate which is not shown in the drawing. The details of the left optical image display unit 28 are the same as those of the right optical image display unit 26. The right optical image display unit 26 and the left optical image display unit 28 are collectively called simply an "optical image display unit". The optical image display unit can use an arbitrary method in so far as a virtual image is formed in front of the eyes of the user using image light. For example, the optical image display unit may be realized using diffraction grating or a translucent reflection film.

As illustrated in FIG. 1, the right holding unit 21 is provided to extend through a location corresponding to the side head of the user from the other end ER of the right optical image display unit 26. The left holding unit 23 is provided to extend through a location corresponding to the side head of the user from the other end EL of the left optical image display unit 28. The right holding unit 21 and the left holding unit 23 maintain the image display unit 20 on the head of the user like the temples of the glasses.

As illustrated in FIG. 1, the right display driving unit 22 is arranged on the inner side (side facing the head of the user) of the right holding unit 21. The left display driving unit 24 is arranged on the inner side of the left holding unit 23. As illustrated in FIG. 2, the right display driving unit 22 includes a reception unit (Rx) 53, a right back light (BL) control unit 201 and a right back light 221 which function as light sources, a right Liquid Crystal Display (LCD) control unit 211 and a right LCD 241 which function as display elements, and a right projection optical system 251. The left display driving unit 24 includes a reception unit 54, a left back light control unit 202 and a left back light 222 which function as light sources, a left LCD control unit 212 and a left LCD 242 which function as display elements, and a left projection optical system 252. The details of the respective units included in the left display driving unit 24 are the same as those of the right display driving unit 22. The right back light control unit 201, the right LCD control unit 211, the right back light 221, and the right LCD 241 are collectively called simply an "image light generation unit". The right display driving unit 22 and the left display driving unit 24 are collectively called simply a "display driving unit".

The reception unit 53 functions as a receiver for serial transmission between a control unit 10 and the image display unit 20. The right back light control unit 201 drives the right back light 221 based on an input control signal. The right back light 221 is, for example, a luminous body such as a Light Emitting Diode (LED) or an Electro-luminescence (EL). The right LCD control unit 211 drives the right LCD 241 based on a clock signal PCLK input through the reception unit 53, a vertical synchronizing signal VSync, a horizontal synchronizing signal HSync, and image data Data for the right eye. The right LCD 241 is a transmission-type liquid crystal panel in which a plurality of pixels are arranged in a matrix shape. The right projection optical system. 251 is a collimate lens which converts image light emitted from the right LCD 241 into light flux in a parallel state.

As illustrated in FIG. 1, the cameras 61 are stereo cameras which are respectively arranged in locations corresponding to the upper sides of the corners of the right and left eyes of the user. The right and left cameras 61 respectively capture outside views (external view) in a surface side direction of the image display unit 20, in other words, the visual field direction of the user in a state of wearing the HMD 100, and acquires two outside view images corresponding to the right and left sides. The cameras 61 are so-called visual light cameras, and the outside view images which are acquired by the cameras 61 are images which indicate the shapes of an object from visual light emitted from the object. In the embodiment, although the cameras 61 are the stereo cameras, the cameras 61 may be ocellar cameras. The cameras 61 function as an "image acquisition unit".

As illustrated in FIG. 1, the gaze detection units 62 are respectively arranged in locations corresponding to the lower sides of the corners of the right and left eyes of the user. The right and left gaze detection units 62 include an infrared light emitting section and an infrared light reception section which are not shown in the drawing. The right-side gaze detection unit 62 receives infrared light which is emitted from the infrared light emitting section and reflected at the right eye of the user. The CPU 140 of the control unit 10 acquires the motion of the gaze of the right eye of the user based on the strength of infrared light received by the right-side gaze detection unit 62. In the same manner, the left-side gaze detection unit 62 receives infrared light which is emitted from the infrared light emitting section and reflected at the left eye of the user. The CPU 140 detects the gaze of the left eye of the user based on the strength of infrared light received by the left-side gaze detection unit 62. The reflectance of infrared light differs in a case in which infrared light is hit on a iris (pupil), a case in which infrared light is hit on an eyelid, and a case in which infrared light is hit on the white of the eye, respectively. Therefore, the CPU 140 can acquire the motion of the gaze of the user based on the strength of infrared light received by the gaze detection unit 62. In this case, the gaze detection unit 62 and the CPU 140 function as a "gaze detection unit" that detects the gaze direction of the user. In the embodiment, the gaze detection units 62 are respectively provided on the right and left sides. However, the gaze detection unit may be provided any one of the right and left side.

As illustrated in FIG. 1, the microphone 63 is a microphone which is arranged in a location corresponding to the upper side of the nose of the user. The microphone 62 acquires outside sound. The "sound" means sound which includes not only the voice of a person but also machine sound in the broad sense.

As illustrated in FIG. 1, the 9-axial sensor 66 is arranged in a location corresponding to the right-side temple of the user. The 9-axial sensor 66 is a motion sensor which detects acceleration (3 axes), angular velocity (3 axes), and terrestrial magnetism (3 axes). The 9-axial sensor 66 is provided in the image display unit 20. Therefore, when the image display unit 20 is mounted on the head of the user, the 9-axial sensor 66 functions as a motion detection unit which detects the motion of the head of the user of the head mounted display 100. Here, the motion of the head includes the velocity, acceleration, angular velocity, and direction of the head and the change in the direction.

As illustrated in FIG. 1, the image display unit 20 includes a connection unit 40 for connecting the image display unit 20 to the control unit 10. The connection unit 40 includes a main body cord 48 which is connected to the control unit 10, a right code 42 and a left code 44 into which the main body cord 48 is branched, and a connection member 46 which is provided at a branching point. In the connection member 46, a jack is provided to connect an earphone plug 30. A right earphone 32 and a left earphone 34 extend from the earphone plug 30. The image display unit 20 and the control unit 10 transmit various signals through the connection unit 40. It is possible to employ, for example, a metal cable or an optical fiber for each of the codes of the connection unit 40.

A-2-2. Configuration of Control Unit

The control unit 10 is an apparatus for controlling the HMD 100. As illustrated in FIG. 1, the control unit 10 includes a determination key 11, a lighting part 12, a display switching key 13, a track pad 14, a brightness switching key 15, a direction key 16, a menu key 17, and a power switch 18. The determination key 11 detects push-down manipulation, and outputs a signal for determining content manipulated in the control unit 10. The lighting part 12 is realized by, for example, an LED, and notifies about the operational state (for example, ON/OFF of the power source) of the HMD 100 using a light-emitting state. The display switching key 13 detects push-down manipulation, and outputs, for example, a signal for switching the display mode of the content moving image between 3D and 2D. The track pad 14 detects the manipulation of the finger of the user on the manipulation surface of the track pad 14, and outputs a signal according to the result of the detection. It is possible to employ various methods, such as electrostatic type, a pressure detection type, and an optical type, as the track pad 14. The brightness switching key 15 detects the push-down manipulation, and outputs a signal for increasing or decreasing the brightness of the image display unit 20. The direction key 16 detects the push-down manipulation performed on a key corresponding to up and down and right and left directions, and outputs a signal according to the result of the detection. The power switch 18 detects the slide manipulation of the switch, and switches the power source charging state of the HMD 100.

As illustrated in FIG. 2, the control unit 10 includes an input information acquisition unit 110, a storage unit 120, a power source 130, a wireless communication unit 132, a GPS module 134, a CPU 140, an interface 180, and transmission units (Tx) 51 and 52. The respective units are connected to each other through a bus which is not shown in the drawing.

The input information acquisition unit 110 acquires signals according to manipulation input for the determination key 11, the display switching key 13, the track pad 14, the brightness switching key 15, the direction key 16, the menu key 17, and the power switch 18. The input information acquisition unit 110 can acquire manipulation input using various methods other than the above-described methods. For example, the gestures of the user may be detected by the cameras 61, and manipulation input may be acquired according to a command associated with the gestures. When the gestures are detected, it is possible to use the fingertip of the user, a ring which is put on the user's hand, a medical instrument which is placed on the user's hand, or the like as a mark for motion detection. For example, the gaze of the user, which is detected by the gaze detection unit 62, or manipulation input according to a command associated with the motion of eyes may be acquired. Setting may be performed such that the command can be added by the user. For example, sound, which is acquired by the microphone 63, may be acquired through manipulation input performed by recognizing the sound. For example, manipulation input may be acquired by a foot switch (a switch which is manipulated by the foot of a user) which is not shown in the drawing. If manipulation input can be acquired using the methods, the input information acquisition unit 110 can acquire manipulation input from the user in an operation in which it is difficult for the user to release user's hands.

The storage unit 120 includes a ROM, a RAM, a DRAM, a hard disk, or the like. Various computer programs including an Operating System (OS) are stored in the storage unit 120. In addition, processing information 122 is stored in the storage unit 120 in advance.

Figure 3:
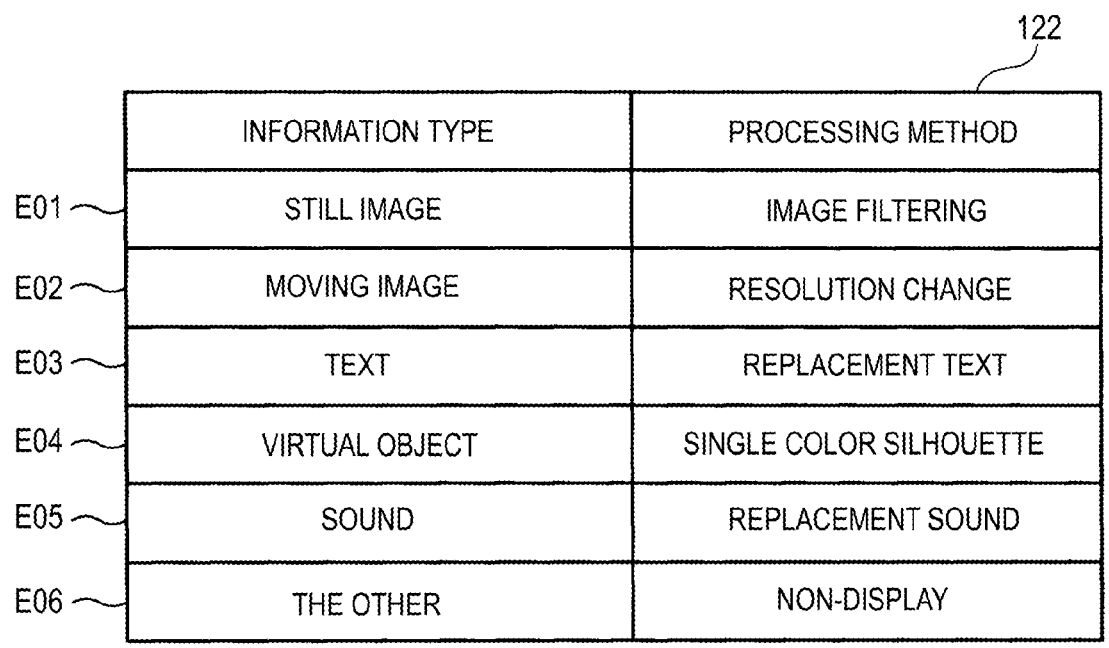
FIG. 3 is a diagram illustrating an example of processing information.

FIG. 3 is a diagram illustrating an example of the processing information. The processing information 122 is information which is used when information (display information) displayed to the user of the HMD 100 is processed in the sharing process. In the processing information 122, an information type is associated with a processing method and the information type and the processing method are stored. The "information type" indicates the type of the display information. The "processing method" indicates a method for processing the display information in the sharing process. In the example of FIG. 3, in the sharing process, it is understood that image filtering is performed when the type of the display information is a still image (entry E01). In the same manner, it is understood that resolution is changed when the type of the display information is a moving image (entry E02), alternate text is embedded when the type of the display information is a text string (entry E03), replacement into a single color silhouette image is performed when the type of the display information is a virtual object (entry E04), replacement into alternative sound is performed when the type of the display information is sound (entry E05), and non-display is performed when the type of the display information is not included in the above description (entry E06).

As illustrated in FIG. 2, the power source 130 supplies power to each of the units of the HMD 100. It is possible to use, for example, a secondary battery as the power source 130. The wireless communication unit 132 performs wireless communication with an external apparatus (for example, the HMD 100x in the example of FIG. 1) in compliance with predetermined wireless communication standards. The predetermined wireless communication standard includes, for example, near field wireless communication which is exemplified in infrared rays or Bluetooth (registered trademark), a wireless LAN which is exemplified in IEEE802.11, and the like. The GPS module 134 detects the current location of the user of the HMD 100 by receiving signals from the GPS satellites, and generates current location information which indicates the current location information of the user. The current location information can be realized by, for example, coordinates which indicate latitude/longitude.

The CPU 140 functions as an augmented reality processing unit 142, an acquisition unit 144, a processing unit 146, a transmission unit 148, an operating system (OS) 150, an image processing unit 160, a sound processing unit 170, and a display control unit 190 by reading and executing computer programs which are stored in the storage unit 120.

The augmented reality processing unit 142 performs the augmented reality process. The augmented reality process is a process for performing display by adding a virtual object to an actual object which is present in a real world, and includes the following procedures b1 to b6.

(b1) Acquire Outside View Images:

The augmented reality processing unit 142 acquires outside view images which are taken by the cameras 61.

(b2) Specify Target Object:

The augmented reality processing unit 142 specifies an actual object (hereinafter, referred to as a "target object") that is a target to which a virtual object is added from among actual objects which are included in the outside view images acquired in procedure b1. For the specification, the augmented reality processing unit 142 may use a table in which information for specifying an actual object and information for specifying a virtual object are associated. The table is stored in the storage unit 120 of the HMD 100 in advance. The table may be automatically generated by the augmented reality processing unit 142 through image recognition using the outside view images taken by the cameras 61. In addition, the table may be generated or edited by the user of the HMD 100. When the table is generated or edited by the user, manipulation input based on gestures or manipulation input based on recognition of sound of utterance content may be used.

(b3) Acquire Location of Target Object:

The augmented reality processing unit 142 acquires the location of the target object. Here, the "location" includes a distance from the user, and the location of the user in the horizontal direction and the vertical direction within a visual field. Here, the augmented reality processing unit 142 may calculate the location of the target object using two or more outside view images acquired by the cameras 61 which are stereo cameras. In addition, the augmented reality processing unit 142 may calculate the location of the target object using one or more outside view images acquired by the cameras 61 together with various sensors (for example, a depth sensor, a distance measuring sensor, or the like) which are not shown in the drawing.

(b4) Acquire Virtual Object:

The augmented reality processing unit 142 acquires or generates an image, a letter, a graphic symbol, and the like (for example, a pointer, a shortcut, a menu, a radio button, a selection button, a soft keyboard, and the like) which indicate the virtual object. The augmented reality processing unit 142 may store the virtual object in the storage unit 120 in advance, or may acquire the virtual object from another apparatus which is connected to the HMD 100 through a network.

(b5) Arrange Virtual Object:

The augmented reality processing unit 142 generates additional image data, in which the virtual object acquired in procedure a4 is arranged, by fitting to the location of the target object acquired in procedure b3. When the location fitting is performed, the augmented reality processing unit 142 may use a characteristic part (engine or the like) of the target object, or may use a mark or the like which is attached to the target object. When the location fitting is performed, the augmented reality processing unit 142 may use image recognition using the model (or image) of the target object which is stored in the storage unit 120 in advance, or may be based on an instruction by the user. In addition, when the virtual object is arranged, the augmented reality processing unit 142 may perform an image process, such as enlargement, reduction, rotation, color conversion, on the virtual object.

(b6) Display:

The augmented reality processing unit 142 transmits an image based on the generated image data to the image processing unit 160, and displays the image on the optical image display units 26 and 28 of the image display unit 20.

The acquisition unit 144 acquires information (display information and information a1 to a3) which is displayed to the user of the HMD 100 in the sharing process. The processing unit 146 processes display information based on the processing information 122 in the sharing process. The transmission unit 148 transmits the processed display information to the HMD 100x, and displays the display information on the HMD 100x in the sharing process. The details will be described later.

The image processing unit 160 performs a signal process for image display. Specifically, when content is input through the interface 180 or the wireless communication unit 132, the image processing unit 160 generates image data Data based on content. When the image processing unit 160 receives image data from other functional units of the HMD 100, the image processing unit 160 sets the received data to the image data Data. The image processing unit 160 may perform image processes, such as a resolution conversion process, various tone correction processes for brightness or chroma adjustment, and a keystone correction process, on the image data Data. The image processing unit 160 transmits the above-described image data Data, the clock signal PCLK, the vertical synchronizing signal VSync, and the horizontal synchronizing signal HSync to the image display unit 20 through the transmission units 51 and 52. The image data Data which is transmitted through the transmission unit 51 is called "right eye image data Data1", and image data Data which is transmitted through the transmission unit 52 is called "left eye image data Data2".

The display control unit 190 generates control signals which control the right display driving unit 22 and the left display driving unit 24. Specifically, the display control unit 190 individually controls the driving ON/OFF of the right and left LCDs 241 and 242 by the right and left LCD control units 211 and 212 and the driving ON/OFF of the right and left back lights 221 and 222 by the right and left back light control units 201 and 202 using the control signals. Therefore, the display control unit 190 controls the generation and emission of image light by the respective right display driving unit 22 and left display driving unit 24. The display control unit 190 transmits the control signals to the image display unit 20 through the transmission units 51 and 52.

The sound processing unit 170 acquires a sound signal included in the content, amplifies the acquired sound signal, and supplies the sound signal to the speaker, which is not shown in the drawing, of the right earphone 32 and the speaker, which is not shown in the drawing, of the left earphone 34.

The interface 180 performs communication with an external apparatus OA in compliance with predetermined wired communication standards. The predetermined wired communication standards include, for example, wired LANs which are exemplified in Micro Universal Serial Bus (USB), a USB, High Definition Multimedia Interface (HDMI, registered trademark), Digital Visual Interface (DVI), Video Graphics Array (VGA), composite, Recommended Standard 232 (RS-232C), IEEE802.3, and the like. It is possible to use, for example, a Personal Computer (PC), a mobile phone terminal, a game terminal, and the like as the external apparatus OA.

Figure 4A:
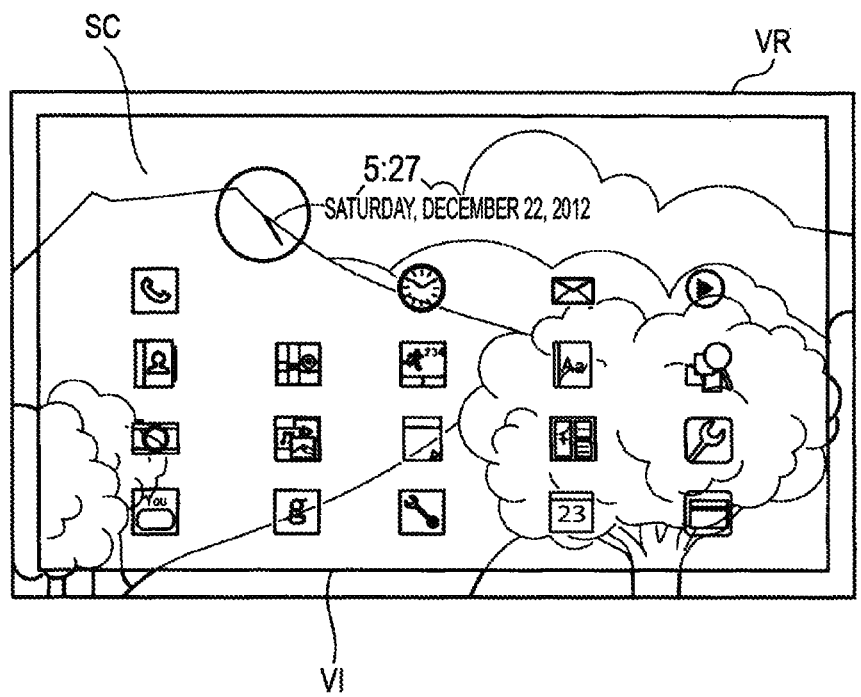
FIGS. 4A and 4B are explanatory diagrams illustrating examples of virtual images which are visually recognized by a user.
Figure 4B:
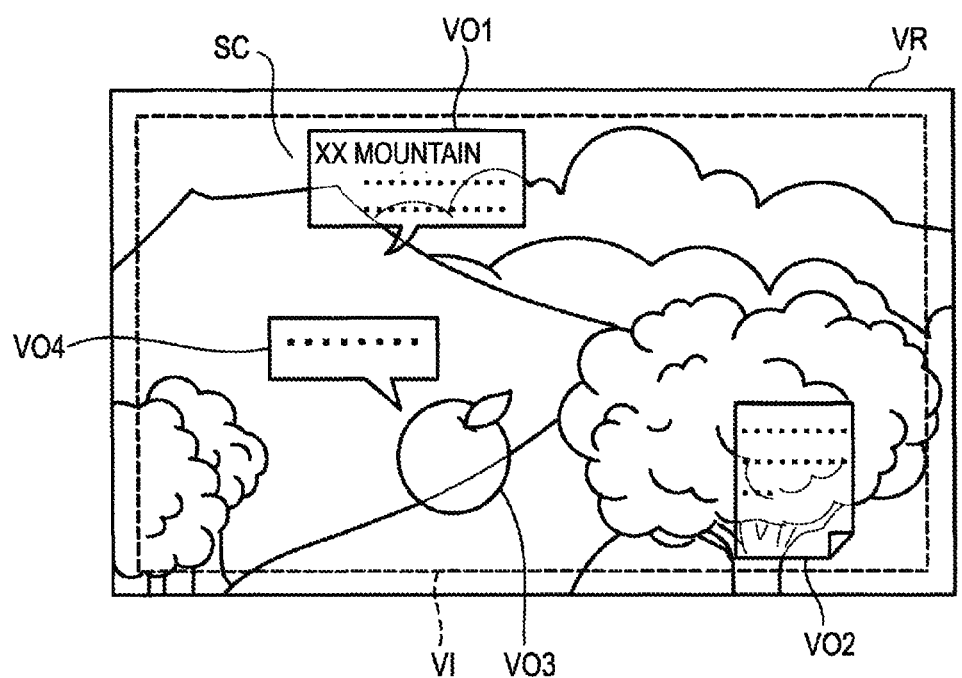

FIGS. 4A and 4B are explanatory diagrams illustrating examples of virtual images which are visually recognized by a user. FIG. 4A illustrates a visible range VR of the user when the augmented reality process is not performed. When image light which is led to the both eyes of the user of the HMD 100 forms an image on the retinas of the user using the above-describe method, the user visually recognizes a virtual image VI. In the example of FIG. 4A, the virtual image VI is a standby screen of the OS 150 of the HMD 100. The user visually recognizes the outside view SC through the right optical image display unit 26 and the left optical image display unit 28. As above, the user of the HMD 100 according to the embodiment can view a virtual image VI and an outside view SC behind the virtual image VI for a part at which the virtual image VI in the visible range VR is displayed. In addition, the user can directly view the outside view SC through the optical image display unit for apart at which the virtual image VI in the visible range VR is not displayed.

FIG. 4B illustrates a visible range VR of the user when the augmented reality process is performed. When the augmented reality processing unit 142 performs the above-described augmented reality process, the user visually recognizes a virtual image VI including a virtual object. In the example of FIG. 4B, a virtual object VO1 is balloon-shaped information which is displayed in the vicinity of a mountain (actual object) of the outside view SC. Here, "vicinity" means a distance (for example, several centimeters) at a degree which causes the user to remind the relationship between the actual object and the virtual object. In addition, the "vicinity" according to the embodiment includes a case in which at least parts of the actual object and the virtual object are superimposed. A virtual object VO2 is note-shaped information which is displayed to be superimposed on a tree (actual object) of the real world in the outside view SC. A virtual object VO3 is an apple image which is arranged to be superimposed on a road (actual object) of the real world in the outside view SC. A virtual object VO4 is balloon-shaped information which is displayed in the vicinity of the apple image, that is, the virtual object VO3. As above, when the user views both the virtual objects VO1 to VO4 which are included in the virtual image VI and the actual objects in the outside view SC, which are viewed through behind the virtual image VI, the user can senses the augmented reality.

A-3. Configuration of HMD 100x

The configuration of the HMD 100x is the same as that of the HMD 100 which is described with reference to FIGS. 1 and 2 excepting that the operation of the acquisition unit 144 is different, the processing unit 146 is not included, and the transmission unit 148 is not provided. Hereinafter, for distinction, the augmented reality processing unit 142 of the HMD 100x is called a "reception-side augmented reality processing unit 142", the acquisition unit 144 is called a "reception-side acquisition unit 144", and the image display unit 20 is called a "reception-side image display unit 20".

The HMD 100x functions as an "image display apparatus" and "another head mounted display".

A-4. Sharing Process

Figure 5:
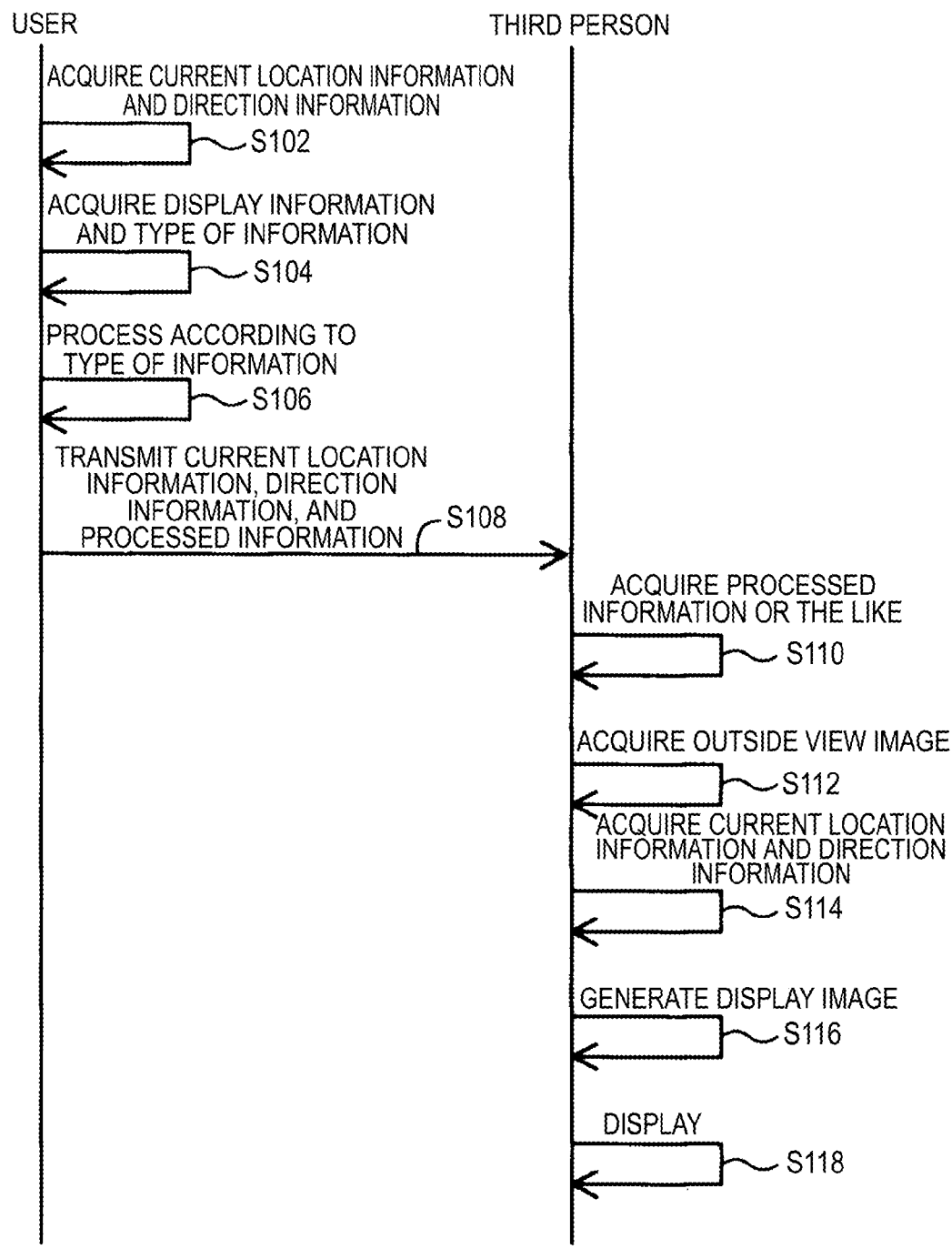
FIG. 5 is a sequence diagram illustrating a procedure of a sharing process.

FIG. 5 is a sequence diagram illustrating the procedure of a sharing process. A sharing process according to a first embodiment is performed in such a way that the HMDs 100 and 100x cooperate with each other. It is possible to arbitrarily determine the start trigger of the sharing process. For example, a process start request from the OS 150 or a specified application of the HMD 100 may be set to the start trigger.

In step S102, the acquisition unit 144 of the HMD 100 acquires current location information which is acquired by the GPS module 134 and direction information which is acquired by the 9-axial sensor 66. In step S104, the acquisition unit 144 acquires display information (for example, information a1 to a3) which is currently displayed as the virtual image VI (FIGS. 4A and 4B) in the HMD 100. In addition, when the acquisition unit 144 analyzes the acquired display information, the acquisition unit 144 acquires the type of the display information. The type of the display information includes a still image, a moving image, text, a virtual object, sound, and the other (FIG. 3). The display information and the type of the display information, which are acquired in step S104, may be combined in the plural.

In step S106, the processing unit 146 of the HMD 100 processes the display information. Specifically, the processing unit 146 searches the processing information 122 by using the type of the display information acquired in step S104 as a key, and acquires a processing method associated with the type. The display information acquired in step S104 is processed according to the acquired processing method. The processed display information is also called "processed information".

When the process in step S106 is performed, it is preferable that the processing unit 146 performs a process of reducing the detail, the clarity and the like of the information in the display information. For example, when image filtering (entry E01) is performed, the processing unit 146 performs processes of changing texture in the display information, adding noise, changing the image into a mosaic, adding gradation, and the like. Therefore, it is possible to realize the process of reducing the detail, the clarity and the like of the information in the display information. When resolution changing (entry E02) is performed, the processing unit 146 lowers the resolution, and thus it is possible to realize the same process. When alternate text embedding (entry E03) is performed, the processing unit 146 sets the alternate text to a text string, such as "XXX", which does not have meaning, and thus it is possible to realize the same process. When replacement into alternative sound (entry E05) is performed, the processing unit 146 sets the alternative sound to sound which does not have meaning, and thus it is possible to realize the same process.

In step S108, the transmission unit 148 of the HMD 100 transmits the current location information, the direction information, and the processed information (hereinafter, collectively referred to as "processed information or the like") which are acquired in step S102, to the HMD 100x. When the transmission is performed, the transmission unit 148 can use broadcast-transmission. When the broadcast-transmission is used, the transmission unit 148 can simply and collectively transmit processed information or the like to a plurality of image display apparatuses (the HMD 100x in the example of FIG. 1) in a broadcast range. In addition, when the broadcast-transmission is used, the transmission unit 148 may not know the addresses, that is, network addresses of the plurality of image display apparatuses.

In step S110, the reception-side acquisition unit 144 of the HMD 100x acquires the processed information or the like. In step S112, the reception-side augmented reality processing unit 142 acquires the outside view images. Step S112 corresponds to procedure b1 of the augmented reality process. In step S114, the reception-side augmented reality processing unit 142 acquires the current location information which is acquired by the GPS module 134 of the HMD 100x and the direction information which is acquired by the 9-axial sensor 66.

In step S116, the reception-side augmented reality processing unit 142 generates a display image. Specifically, when the reception-side augmented reality processing unit 142 performs the procedure b2 to b5 of the above-described augmented reality process according to the following steps, it is possible to generate the display image (additional image data).

The reception-side augmented reality processing unit 142 sets the target object in procedure b2 to "the user of the HMD 100".

When the reception-side augmented reality processing unit 142 acquires the location of the target object in procedure b3, the reception-side augmented reality processing unit 142 may use the current location information and the direction information of the HMD 100 acquired in step S110 together with the current location information and the direction information of the HMD 100x acquired in step S114.

The reception-side augmented reality processing unit 142 uses the "processed information acquired in steps S110" as the virtual object in procedure b4.

In step S118, the reception-side augmented reality processing unit 142 of the HMD 100x displays the display image (additional image data) on the reception-side image display unit 20. Step S118 corresponds to procedure b6 in the augmented reality process.

Figure 6:
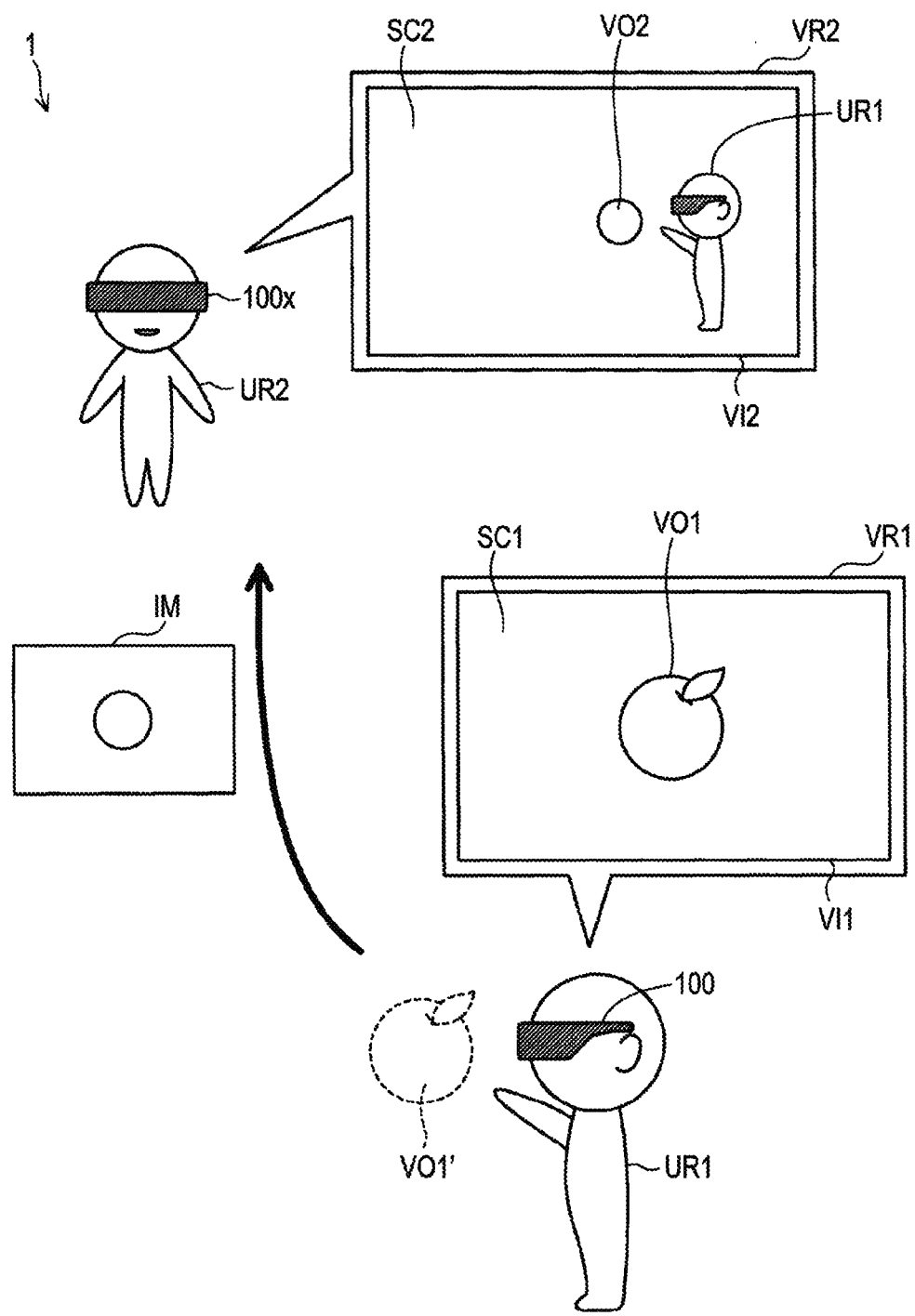
FIG. 6 is a diagram illustrating a result acquired when the sharing process is performed.

FIG. 6 is a diagram illustrating a result acquired when the sharing process is performed. As a result acquired after the augmented reality process is performed in the HMD 100, a user UR1 of the HMD 100 visually recognizes a virtual image VI1, which indicates the virtual object VO1 of an apple, in the visible range VR1. The user UR1 has a feeling like an apple VO1' which is not present in the real world exists in front of eyes. The user UR1, for example, extends hand forward in order to perform an operation for manipulating the apple VO1' (manipulating the control unit 10 of the HMD 100). Here, when the sharing process illustrated in FIG. 5 is performed, processed information IM, which is acquired by silhouetting the virtual object VO1 of the apple, is transmitted to the HMD 100x from the HMD 100 (an arrow in the drawing). As a result that steps S110 to S118 in the sharing process are performed in the HMD 100x which receives the processed information IM, a user UR2 (third person) of the HMD 100x visually recognizes a virtual image VI2 indicative of the virtual object VO2 into which the virtual object VO1 of the apple is silhouetted, in the visible range VR2. In addition, the third person UR2 visually recognizes the user UR1 in the outside view SC2 through the right optical image display unit 26 and the left optical image display unit 28. As a result, the third person can perceive what the user UR1 views and can perceive what the user UR1 tries to do.

As above, according to the sharing process of the first embodiment, the transmission unit 148 of the HMD 100 transmits the display information (virtual object VO1), which is information displayed to the user UR1 as the virtual image VI1, to the image display apparatus (HMD 100x) which is connected to the head mounted display (HMD 100). The third person (user UR2) who views the displayed display information on the image display apparatus which receives the display image can perceive what the user UR1 of the head mounted display views. As a result, even when the user UR1 of the head mounted display performs the operation for manipulating the head mounted display (for example, gestures, utterances, or the like), the display information is unlikely to be artificially reflected in the eyes of the third person UR2. That is, when viewed from the perspective of the eyes of the third person UR2, it is possible to reduce the artificiality of the operation for manipulating the head mounted display. Further, the display information, which is transmitted by the transmission unit 148 of the HMD 100 to the image display apparatus and is caused to be displayed, is the processed display information (processed information and virtual object VO2 which is acquired after the virtual object VO1 is silhouetted). Therefore, when, for example, the process of reducing the detail, the clarity and the like of the information in the display information is performed, the transmission unit 148 can improve security accompanying with the release of the display information to the third person compared to a case in which the display information is transmitted to the image display apparatus and is caused to be displayed.

Further, according to the sharing process (step S106) of the embodiment, the processing unit 146 of the HMD 100 changes a processing method according to the type of the display information (for example, a still image, a moving image, text, a virtual object, sound, and the other). Therefore, the processing unit 146 can employ an optimal processing method for each information type, and can change the degree of release to the third person for each information type.

Further, according to the sharing process of the embodiment, it is possible to configure the image display apparatus for releasing the display information to the third person UR2 as the head mounted display (HMD 100x). In addition, according to step S116 of the sharing process, the reception-side augmented reality processing unit 142 causes the display information VO2 to be visually recognized in the vicinity of the user UR1 of the head mounted display (HMD 100) in the visual field of the third person UR2. Therefore, the third person UR2 can more intuitively associate and understand the user UR1 of the head mounted display with the information which is viewed by the user.

A-5. Variation in Sharing Process

In the above-described sharing process, it is possible to employ variations listed below. The variations may be independently employed or may be employed after being combined.

A-5-1. First Variation:

In a first variation, the processing unit 146 changes a display information processing method according to the authority of the user (third person) of the HMD 100x instead of the type of the display information. Hereinafter, only configurations and operations which are different from those of the first embodiment will be described. The configurations and operations which are not described below are the same as those in the first embodiment.

The HMD 100 includes processing information 122a instead of the processing information 122. In the processing information 122*a*, user identification information and a processing method are stored after being associated with each other. The "user identification information" is information for uniquely identify users of one or more image display apparatuses (HMD 100*x* in the example of FIG. 1) which are connected to the HMD 100. As a result, in the processing information 122*a*, for example, information in which image filtering is performed in the sharing process in a case of user identification information "AAA" and replacement into a single-color silhouette image is performed in the sharing process in a case of user identification information "BBB" is stored. Meanwhile, as the user identification information, information, such as a user's job, for identifying a user group which includes a plurality of users may be used in addition to information, such as a user ID, which is individually attached to the user. As the user identification information, information, such as a user's current location, which indicates a place where the user is present, may be used.

After step 104 of the sharing process (FIG. 5) ends, the acquisition unit 144 of the HMD 100 acquires the user identification information from the HMD 100*x*. In step S106, the processing unit 146 of the HMD 100 searches for the processing information 122*a* using the acquired user identification information as a key, and processes the display information using a processing method according to the result of search.

As above, according to the first variation, the processing unit 146 of the HMD 100 changes the processing method according to the authority of the user (that is, the third person) of the image display apparatus (HMD 100*x*). Therefore, processing unit 146 can change the degree of the release to the user of the image display apparatus according to the level of the authority. For example, when a processing method of largely reducing the detail, the clarity and the like of the information in the display information is designated for a familiar third person and a processing method of slightly reducing the detail, the clarity and the like of the information in the display information is designated for a non-familiar third person in advance in the processing information 122*a*, it is possible to protect the privacy of the user of the HMD 100 and to improve convenience.

Meanwhile, the processing unit 146 may change the processing method according to the combination of the type of the display information and the user identification information. In this case, for the processing information 122*a*, the type of the display information, the user identification information, and the processing method may be stored after being associated with each other. When the processing unit 146 determines the processing method, the processing information 122*a* may be searched for using both the type of the display information and the user identification information as keys.

A-5-2. Second Variation:

In second variation, the processing unit 146 changes the display information processing method using neither the type of the display information nor the authority of the user (third person) of the HMD 100*x*. Hereinafter, only configurations and operations which are different from those of the first embodiment will be described. The configurations and operations which are not described below are the same as those in the first embodiment.

The HMD 100 includes processing information 122*b* instead of the processing information 122. In the processing information 122*b*, a level setting value and a processing method are stored after being associated with each other. The "level setting value" includes a numerical value, a text string, or the like which designates the security level of the processed information. That is, the "level setting value" means that the detail, the clarity and the like of the information in the display information is largely reduced by the processing as the level setting value is high. As a result, in the processing information 122*b*, information is stored which indicates that, for example, replacement into a single color silhouette image is performed in the sharing process in a case of a level setting value "high", image filtering is performed in the sharing process in a case of a level setting value "middle", and resolution conversion is performed in the sharing process in a case of a level setting value "low".

In step S106 of the sharing process (FIG. 5), the processing unit 146 of the HMD 100 processes display information using a processing method based on the designation of the level setting value from the user. The designation of the level setting value from the user may be acquired in the middle of the sharing process or may be stored in the storage unit 120 or the like in advance.

As above, according to the second variation, the processing unit 146 of the HMD 100 can simply perform a process of reducing the detail, the clarity and the like of the information in the display information by only designating the security level of the processed information. According to the second variation, it is possible to omit reference using the type of the display information or the authority of the user (third person) of the HMD 100*x*, and thus it is possible to simplify the processing content of the sharing process.

A-5-3. Third Variation:

In third variation, the sharing process is performed using an information processing apparatus which is connected through a network. Hereinafter, only configurations and operations which are different from those of the first embodiment will be described. The configurations and operations which are not described below are the same as those in the first embodiment.

In the third variation, the image display system 1 is provided with a server 300 in addition to the HMDs 100 and 100*x*. The HMDs 100 and 100*x* are connected to the Internet by wireless communication through a communication carrier which is not shown in the drawing. The server 300 is connected to the Internet by wired or wireless communication. As a result, the HMD 100 and the server 300, and the HMD 100*x* and the server 300 are connected to each other through the Internet.

Figure 7:
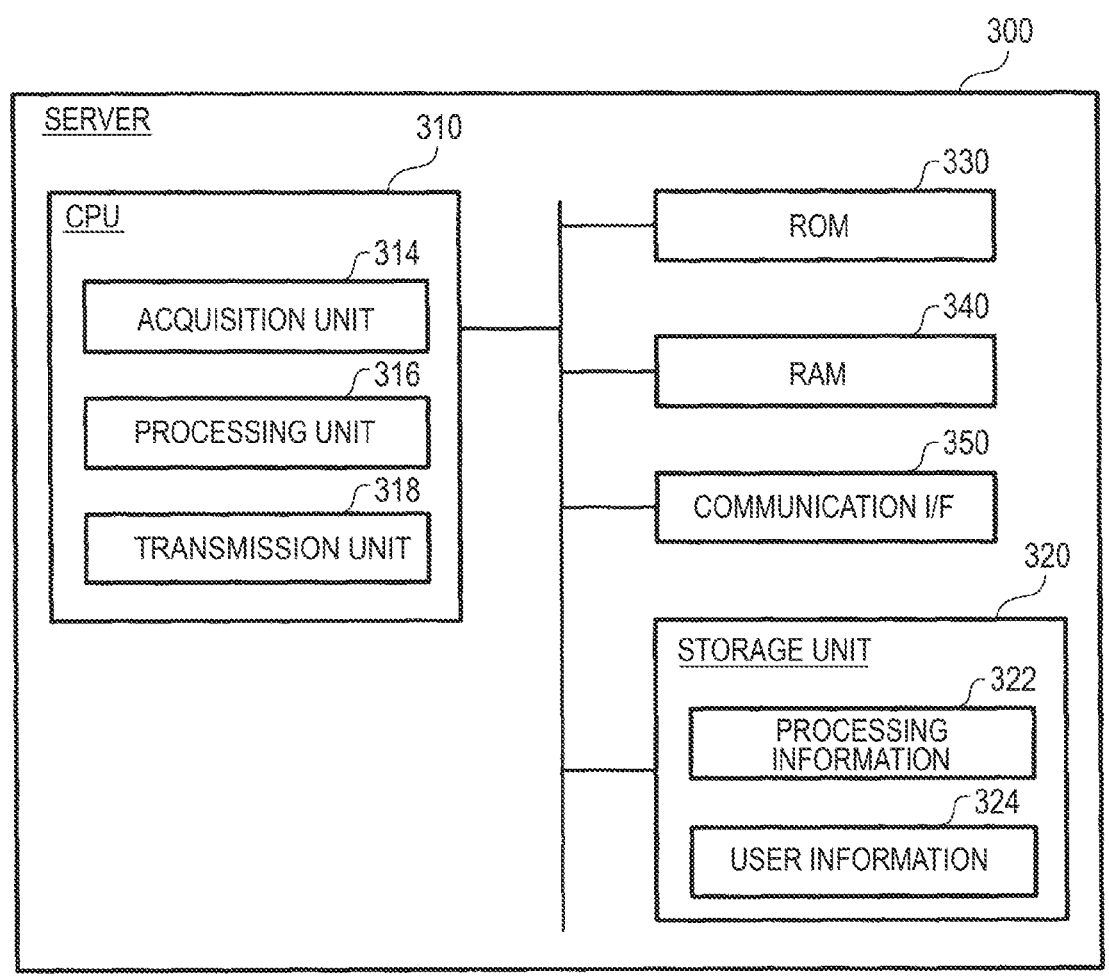
FIG. 7 is a block diagram functionally illustrating the configuration of a server.

FIG. 7 is a block diagram functionally illustrating the configuration of the server 300. The server 300 includes a CPU 310, a storage unit 320, a ROM 330, a RAM 340, and a communication interface (I/F) 350, and each of the units are connected to each other through a bus which is not shown in the drawing.

The CPU 310 controls the respective units of the server 300 by deploying computer programs, which are stored in the storage unit 320 and the ROM 330, in the RAM 340. In addition, the CPU 310 functions as an acquisition unit 314, a processing unit 316, and a transmission unit 318. The acquisition unit 314 acquires information (display information and information a1 to a3), which is displayed to the user of the HMD 100, from the HMD 100 in the sharing process. The processing unit 146 processes the display information based on processing information 322 in the sharing process. The transmission unit 318 transmits the processed display information to the HMD 100*x*, and displays the processed display information on the HMD 100*x* in the sharing process.

The storage unit 320 includes a ROM, a RAM, a DRAM, a hard disk, and the like. In the storage unit 320, various computer programs, including an operating system (OS), are stored. In addition, in the storage unit 320, the processing information 322 and user information 324 are stored. The content of the processing information 322 is the same as that of the processing information 122 illustrated in FIG. 3. The user information 324 is a storage unit used for the server 300 to store display information and the like which are respectively acquired from the plurality of HMDs 100 in the sharing process. The details thereof will be described later.

Figure 8:
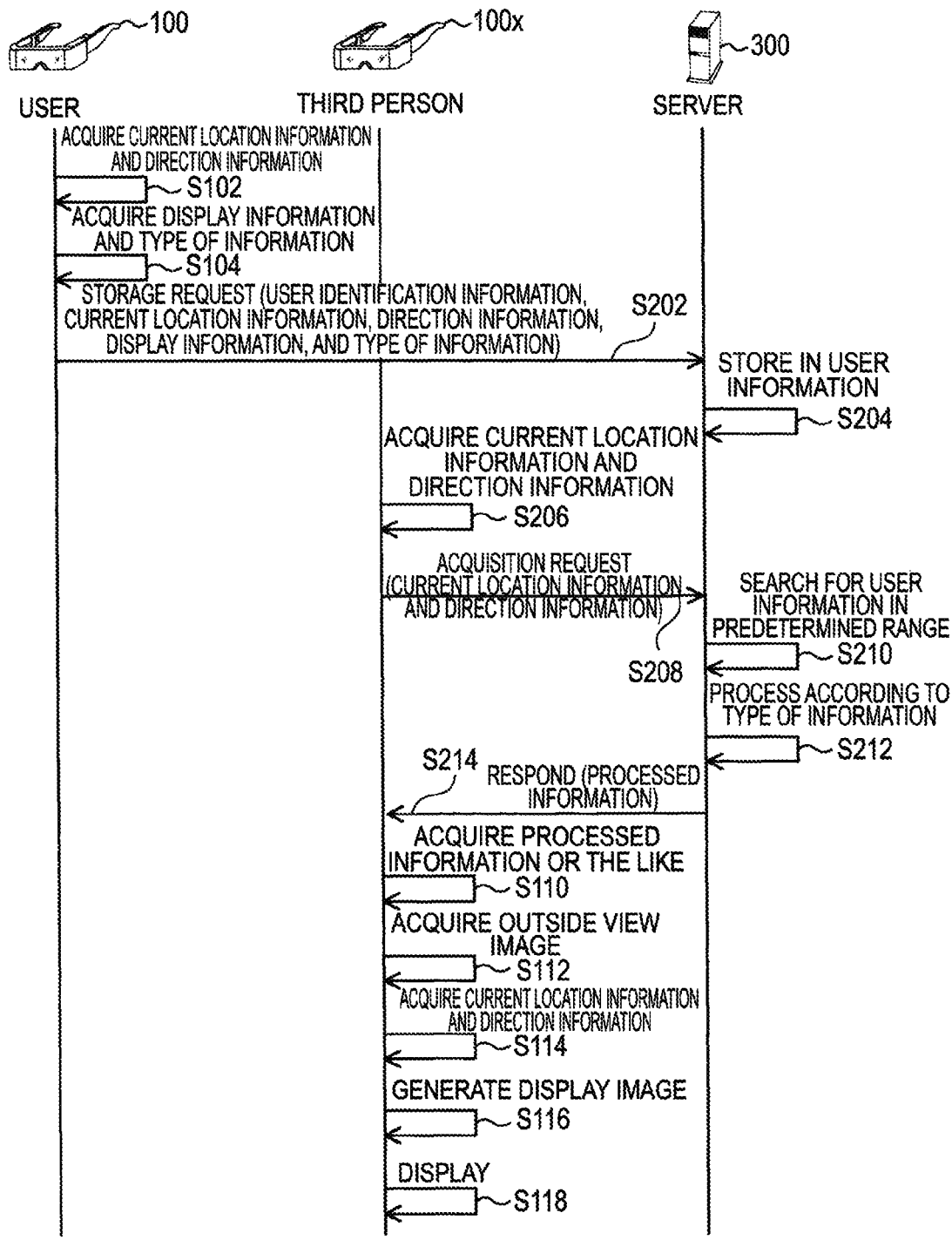
FIG. 8 is a sequence diagram illustrating the procedure of the sharing process in a third variation.

FIG. 8 is a sequence diagram illustrating the procedure of a sharing process according to the third variation. The difference from the first embodiment illustrated in FIG. 5 is that steps S202 to S214 are included instead of steps S106 and S108.

In step S202, the transmission unit 148 of the HMD 100 transmits a storage request to the server 300. The storage request includes user identification information for uniquely identifying the user of the HMD 100, the current location information and the direction information which are acquired in step S102, and the display information and the type of the display information which are acquired in step S104. The current location information which is acquired in step S102 functions as "first current location information".

FIG. 9 is a diagram illustrating an example of the user information 324. The acquisition unit 314 of the server 300 in step S204 of FIG. 8 acquires the display information or the like which is included in the storage request, and stores the display information or the like in the user information 324. As a result, one entry based on the storage request which is acquired from the HMD 100, for example, an entry E03 which indicates user identification information "CCC", current location information "XXXXX", direction information "XXXXX", display information "XXXXX", and the type of the display information "virtual object" is added to the user information 324. Meanwhile, "X" indicates arbitrary data. In this manner, it is possible to accumulate the display information acquired from the plurality of HMDs 100 in the user information 324 of the server 300.

In step S206 of FIG. 8, the reception-side augmented reality processing unit 142 of the HMD 100x acquires the current location information which is acquired by the GPS module 134 of the HMD 100x and the direction information which is acquired by the 9-axial sensor 66. In step S208, the reception-side augmented reality processing unit 142 transmits an acquisition request to the server 300. The acquisition request includes the current location information and the direction information which are acquired in step S206. The current location information which is acquired in step S206 functions as "second current location information".

In step S210, the transmission unit 318 of the server 300 searches for the user information in the predetermined range of the HMD 100x which is the transmission source of the acquisition request. Specifically, the transmission unit 318 searches for an entry, which is present in the predetermined range of the HMD 100x and is acquired from the HMD 100, by comparing the current location information of the HMD 100x, which is included in the acquisition request, with the current location information of the user information 324 (FIG. 9). In step S212, the processing unit 316 of the server 300 processes the display information, which is included in the entry found in step S210, using a processing method according to the type of the display information which is included in the entry found in step S210. The details of the process are the same as in step S106 of FIG. 5. In step S214, the transmission unit 318 of the server 300 transmits a response including the processed information to the HMD 100x.

After the response is received, processes which are the same as those described in steps S110 to S118 of FIG. 5 are performed in the HMD 100x.

In this manner, according to the third variation, it is possible to acquire the same advantage as in the first embodiment. That is, the transmission unit 318 of the server 300 transmits display information, which is information displayed to the user of the head mounted display (HMD 100) as a virtual image, to the image display apparatus (HMD 100x) which is connected to the information processing apparatus (server 300). The third person who views the display information displayed on the image display apparatus which receives the display information can perceive what the user of the head mounted display is viewing. As a result, even when the user of the head mounted display performs an operation (for example, gestures, utterances, or the like) for manipulating the head mounted display, the operation is unlikely to be artificially reflected in the eyes of the third person. That is, when viewed from the perspective of the third person, it is possible to reduce the artificiality of the operation for manipulating the head mounted display. Further, the display information, which is transmitted to and displayed on the image display apparatus by the transmission unit 318 of the server 300, is the processed display information. Therefore, the transmission unit can improve the security accompanying when the display information is released to the third person by, for example, performing a process of reducing the detail, the clarity and the like of the information in the display information, compared to the case of transmitting and displaying the display information to and on the image display apparatus without change.

Further, according to the third variation, it is possible to perform the sharing process by the server 300 instead of the HMD 100, and thus it is possible to reduce processing loads in the HMD 100.

Further, according to the third variation, the transmission unit 318 of the server 300 can automatically display the display information in the head mounted display (HMD 100), which is present in the predetermined range of the image display apparatus (HMD 100x), in other words, the display information in the head mounted display, which is present in the vicinity of the image display apparatus, to the image display apparatus using the current location information (first current location information) of the HMD 100 and the current location information (second current location information) of the HMD 100x.

B. Second Embodiment

B-1. Configuration of Image Display System

In a second embodiment of the invention, a configuration, in which display information is shared between the head mounted display and the image display apparatus that are located in different locations (places), will be described. Hereinafter, only parts, in which configurations and operations are different from those of the third variation according to the first embodiment (FIGS. 7 to 9), will be described. Meanwhile, reference symbols, which are the same as in the third variation which is described above, are attached to the configurations and operations which are the same as in the third variation according to the first embodiment, and the detailed descriptions thereof are not repeated. That is, configurations and operations which will not be described below are the same as the above-described third variation.

Figure 10:
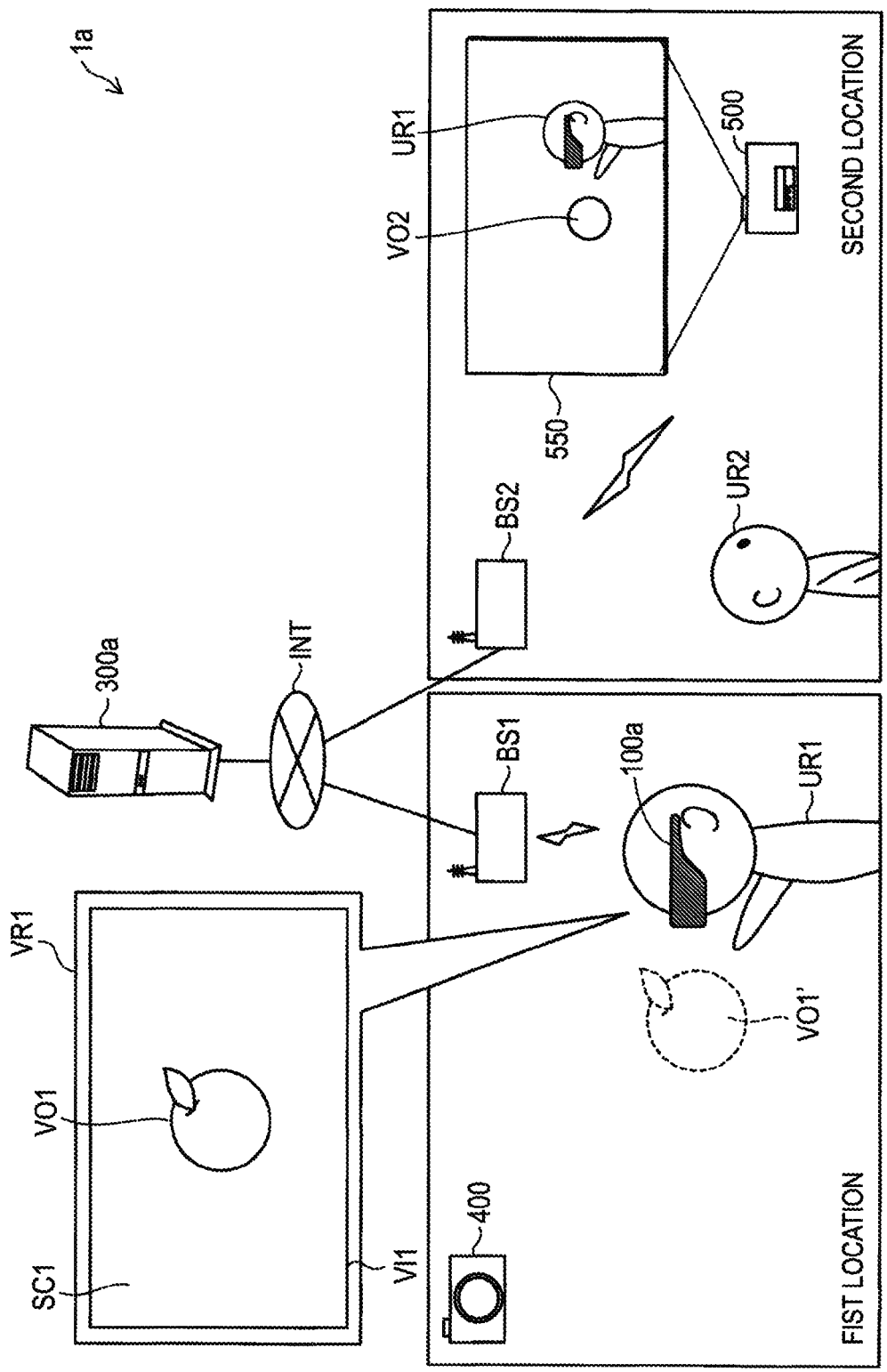
FIG. 10 is an explanatory diagram illustrating the schematic configuration of an image display system according to a second embodiment.

FIG. 10 is an explanatory diagram illustrating the schematic configuration of an image display system according to the second embodiment. An image display system 1a includes an HMD 100a, a server 300a, a camera 400, a projector 500, a screen 550, a communication carrier BS1, and a communication carrier BS2. The HMD 100a, the camera 400, and the communication carrier BS1 are arranged in a first location. The projector 500, the screen 550, and a communication carrier BS2 are arranged in a second location. The first location and the second location are present in locations, for example, different rooms, different buildings, and the like, in which it is difficult to directly see the internal situation with each other.

The camera 400 is arranged in a location where it is possible to take a picture of the entire first location. An image which is acquired by the camera 400 is an image which indicates the shape of an object based on visual light emitted from the object. The image acquired by the camera 400 functions as a "scene image". The projector 500 projects an image to the screen 550 based on the image (image data) which is received through the communication carrier BS2. The projector 500 and the screen 550 function as an "image display apparatus".

The HMD 100a and the camera 400 are connected to the Internet INT through the communication carrier BS1 in wireless communication. The projector 500 is connected to the Internet INT through the communication carrier BS2 in wireless communication. As a result, the HMD 100a and the server 300a, and the projector 500 and the server 300a are connected to each other through the Internet INT. The communication carriers BS1, 2 include a transmission/reception antenna, a wireless base station, and an exchange office.

B-2. Configuration of HMD 100a

The configuration of the HMD 100a is almost the same as that of the third variation according to the first embodiment. However, in the HMD 100a according to the second embodiment, the content of the storage request, which is transmitted by the transmission unit 148 in the sharing process, is different from the third variation illustrated in FIG. 8.

B-3. Configuration of Server 300a

The configuration of the server 300a is almost the same as the third variation according to the first embodiment. However, a fact that the server 300a according to the second embodiment is provided with user information 324a instead of the user information 324, and the content of the processes performed by the acquisition unit 314, the processing unit 316, and the transmission unit 318 in the sharing process are different from the third variation illustrated in FIG. 8.

B-4. Sharing Process

Figure 11:
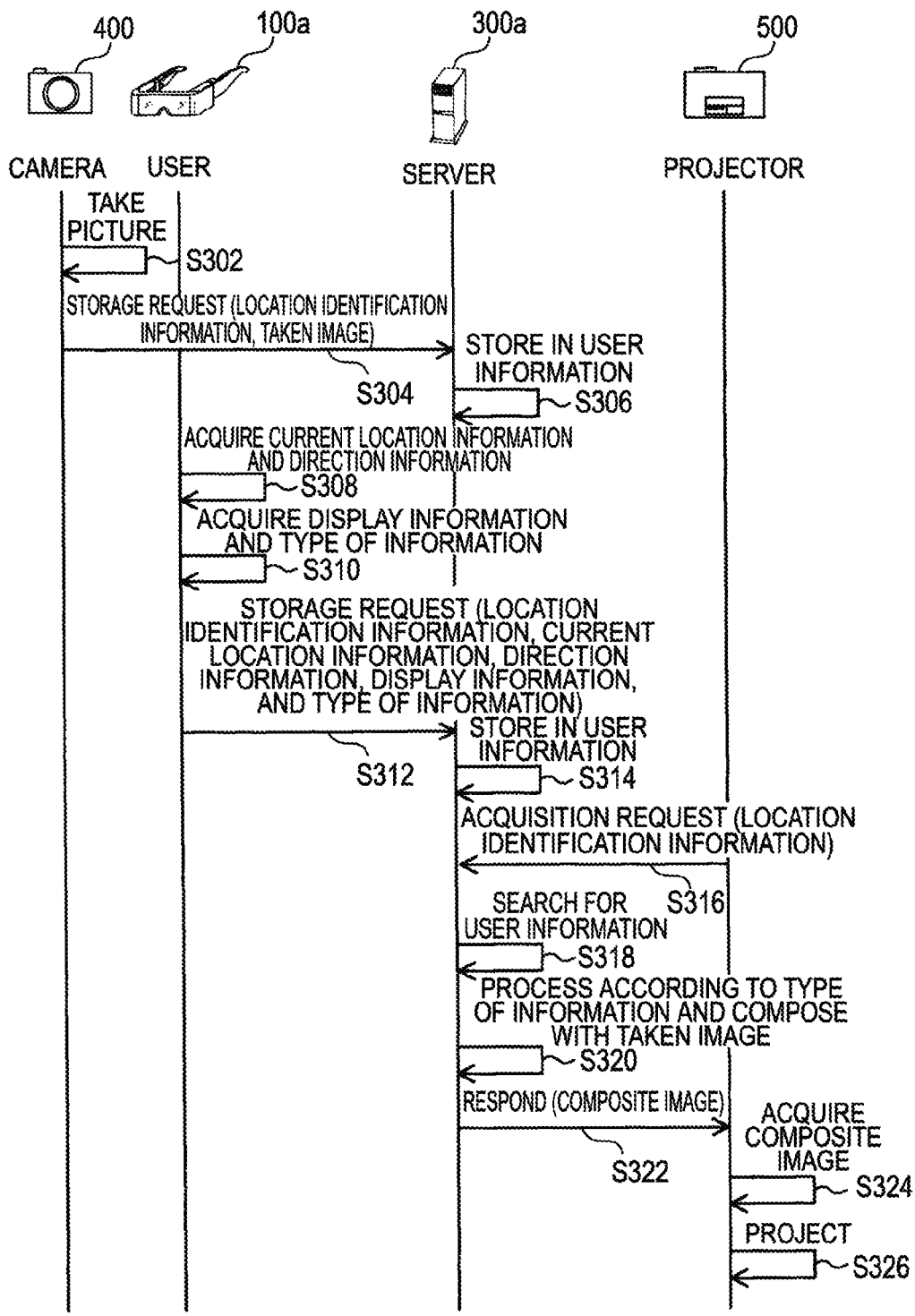
FIG. 11 is a sequence diagram illustrating the procedure of a sharing process according to the second embodiment.

FIG. 11 is a sequence diagram illustrating the procedure of a sharing process according to the second embodiment. In step S302, the camera 400 takes a picture of the entire first location. In step S304, the camera 400 transmits a storage request to the server 300a. In the storage request, location identification information for uniquely identifying the first location and a scene image taken in step S302 are included.

In step S306, the acquisition unit 314 of the server 300a acquires the scene image which is included in the storage request from the camera 400, and temporarily stores the scene image in the storage unit 320.

In step S308, the acquisition unit 144 of the HMD 100a acquires the current location information which is acquired by the GPS module 134 and the direction information which is acquired by the 9-axial sensor 66. In step S310, the acquisition unit 144 acquires display information (for example, information a1 to a3) which is currently displayed as the virtual image in the HMD 100a. In step S312, the transmission unit 148 transmits the storage request to the server 300a. The storage request includes location identification information for uniquely identifying the first location, the current location information and the direction information which are acquired in step S308, and the display information and the type of the display information which are acquired in step S310.

FIG. 12 is a diagram illustrating an example of the user information 324a according to the second embodiment. In step S314 of FIG. 11, the acquisition unit 314 of the server 300a acquires a scene image or the like which is included in the storage request from the camera 400 and display information or the like which is included in the storage request from the HMD 100a, and stores the acquired scene image and the display information in the user information 324a. As a result, one entry (for example, entry E03) is added to the user information 324a based on the storage request which is acquired from the camera 400 and the HMD 100a. In this manner, in the server 300a according to the second embodiment, it is possible to accumulate display information or the like which is acquired from the plurality of HMDs 100a.

In step S316 of FIG. 11, the projector 500 transmits the acquisition request to the server 300a. The acquisition request includes location identification information for designating the location (first location) where the head mounted display (HMD 100a in the example of FIG. 10), which is desired to share the display information with the projector 500, is located.

In step S318, the transmission unit 318 of the server 300a searches for user information including the location identification information which is designated in the acquisition request. Specifically, the transmission unit 318 searches for the user information 324a (FIG. 12) using the location identification information which is included in the acquisition request as a key. In step S320, the processing unit 316 of the server 300a processes the display information, which is included in the entry found in step S318, using a processing method according to the type of the display information which is included in the entry found in step S318. The details are the same as in step S106 of FIG. 5.

In step S320, the processing unit 316 of the server 300a further composes the processed information with the scene image which is included in the entry found in step S318. Specifically, the processing unit 316 can generate composite image (additional image data) by performing procedure b2 to b5 of the above-described augmented reality process according to the followings.

The processing unit 316 uses the scene image which is included in the entry found in step S318 as the "outside view image" of procedure b1.

The processing unit 316 sets the target object in procedure b2 to "the user of the HMD 100a".

When the processing unit 316 acquires the location of the target object of the procedure b3, the processing unit 316 may use the current location information and the direction information of the HMD 100a, which are included in the entry found in step S318, together.

The processing unit 316 uses the "processed information" as the virtual object of the procedure b4.

In step S322, the transmission unit 318 of the server 300a transmits the response, which includes the composite image, to the projector 500. In steps S324 and S326, the projector 500 projects the received composite image to the screen 550.

As a result acquired when the sharing process is performed according to the above-described second embodiment, the user UR2 (third person) of the projector 500 can visually recognize the composite image, which includes the user UR1 of the HMD 100a and the virtual object VO2 that is acquired in such a way that the virtual object VO1 of the apple is silhouetted, as an image which is projected on the screen 550, as illustrated in FIG. 10. As a result, the third person can perceive what the user UR1 views even in locations, for example, different rooms, different buildings, and the like, in which it is difficult to directly see the internal situation with each other, and thus it is possible to perceive what the user UR1 tries to do.

As above, according to the sharing process of the second embodiment, the transmission unit 318 of the server 300a transmits the display information, which is the information displayed to the user UR1 of the head mounted display (HMD 100a) as the virtual image VI1, to the image display apparatuses (projector 500 and screen 550) which are connected to the information processing apparatus (server 300a). In the image display apparatus which receives the display information, the third person UR2 who viewed the displayed display information can perceive what the user UR1 of the head mounted display is viewing. As a result, even when the user UR1 of the head mounted display performs the operation for manipulating the head mounted display (for example, gestures, utterances, or the like), the operation is unlikely to be artificially reflected in the eyes of the third person UR2. That is, when viewed from the perspective of the third person, it is possible to reduce the artificiality of the operation for manipulating the head mounted display. Further, the display information, which is transmitted to and displayed on the image display apparatus by the transmission unit 318 of the server 300a, is the processed display information. Therefore, the transmission unit 318 can improve the security accompanying when the display information is released to the third person by, for example, performing a process of reducing the detail, the clarity and the like of the information in the display information compared to the case of transmitting and displaying the display information to and on the image display apparatus without change.

Further, in the sharing process according to the second embodiment, the transmission unit 318 of the server 300a transmits and displays the display information, which is composed with the scene image including the user UR1 of the head mounted display (HMD 100a), to and on the image display apparatuses (projector 500 and screen 550).

Therefore, when the image display apparatus which releases the display information to the third person UR2 is, for example, a projector, a smart phone, or the like, the third person UR2 can more intuitively associate and understand the user UR1 of the head mounted display with the information which is viewed by the user.

B-5. Variation in Sharing Process

In the sharing process according to the second embodiment, it is possible to employ the first variation which is described in the first embodiment and the second variation. The first and second variations may be independently employed and may be employed after being combined.

C. Third Embodiment

C-1. Configuration of Image Display System

In a third embodiment of the invention, a configuration in which information, the display situation of which is different, is shared between the image display apparatuses will be described. Hereinafter, only parts, in which configurations and operations are different from those of the third variation according to the first embodiment (FIGS. 7 to 9), will be described. Meanwhile, in the drawing, reference symbols, which are the same as in the third variation which is described above, are attached to the configurations and operations which are the same as in the third variation according to the first embodiment, and the detailed descriptions thereof are not repeated. That is, configurations and operations which will be described below are the same as the above-described third variation.

The image display system according to the third embodiment includes an HMD 100x, a server 300b, and a communication carrier. Meanwhile, the image display system according to the embodiment does not include the HMD 100. The HMD 100x and the server 300b are connected to the Internet through a communication carrier. As a result, the HMD 100x and the server 300b are connected to each other through the Internet. The communication carrier includes a transmission/reception antenna, a wireless communication station, and an exchange office.

C-2. Configuration of HMD 100x

The configuration of the HMD 100x is almost the same as in the third variation according to the first embodiment. However, in the HMD 100x according to the third embodiment, the processing content of the reception-side augmented reality processing unit 142 in the sharing process is different from that of the third variation illustrated in FIG. 8.

C-3. Configuration of Server 300b

Figure 13:
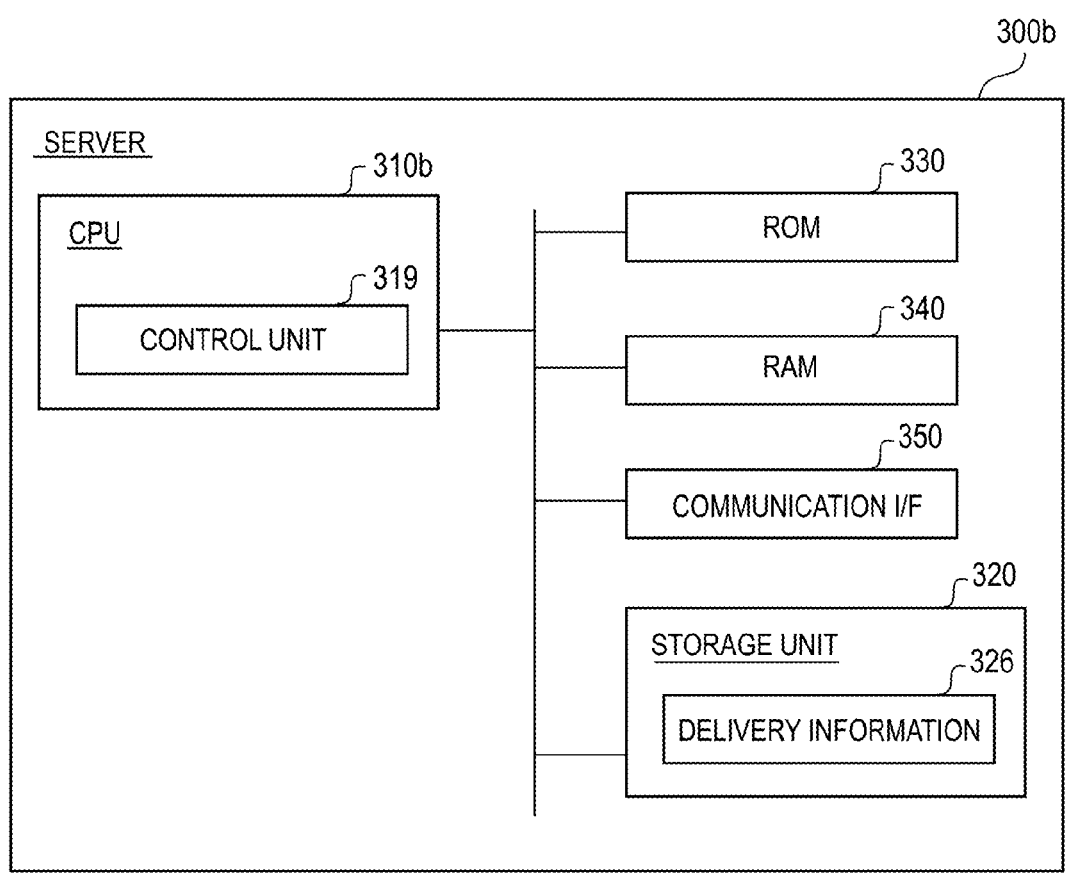
FIG. 13 is a block diagram functionally illustrating the configuration of a server.

FIG. 13 is a block diagram functionally illustrating the configuration of the server 300b. The facts that a control unit 319 is provided instead of the acquisition unit 314, the processing unit 316, and the transmission unit 318, and that delivery information 326 is provided instead of the processing information 322 and the user information 324 are different from the third variation illustrated in FIG. 7. The control unit 319 delivers information to be displayed on the HMD 100x in the sharing process.

FIG. 14 is a diagram illustrating an example of the delivery information 326. The delivery information 326 is information which is used for the server 300b to deliver information in the sharing process. In the delivery information 326, a delivery condition, location information, direction information, delivery information, an information type, and an actual object condition are stored after being associated with each other.

The "delivery condition" is a condition using information about the user of the HMD 100x, which is desired to deliver information by the server 300b, or information about the HMD 100x. In the delivery condition, for example, gender, age, job, preference, and the like may be stored as the condition using information about the user. In addition, in the delivery condition, information for specifying the display performance (for example, an aspect ratio, a resolution, γ property, and the like) of the HMD 100x, a model, a model number, performance, an installed application, and an OS version of the HMD 100x may be stored as, for example, a condition using information about the HMD 100x which is being used by the user. The "location information" is the current location information of the HMD 100x to which the server 300b should deliver information. In the location information, for example, the current location information which is a target is designated in a range. The "direction information" is the direction information of the HMD 100x to which the server 300b should deliver information. In the direction information, for example, the direction information which is a target is designated in a range. The "delivery information" is information which is delivered to the HMD 100x by the server 300b. In the delivery information, information of various forms (a still image, a moving image, text, a virtual object, sound, and the other) may be stored. The "information type" is a delivery information type. The "actual object condition" is a specified actual object which is a target on which the delivery information (virtual object) is superimposed.

The server 300b searches for delivery information which should be delivered to the HMD 100x using the delivery condition, the location information, and the direction information as keys. Meanwhile, the location information and the direction information may be a NULL value. In a case of NULL value, in the sharing process which will be described later, all of the locations and directions become the transmission targets of the delivery information. In addition, the actual object condition may be a NULL value. In a case of a NULL value, the reception-side augmented reality processing unit 142 of the HMD 100x displays the delivery information in a default location (for example, center or the like). The details thereof will be described later. In the example of FIG. 14, it is understood that delivery information which is stored in the entry E01 is delivered when the gender of the user of the HMD 100x is male in a specified current location and in the specified direction. In the same manner, when the gender of the user of the HMD 100x is female in a specified current location and in the specified direction, it is understood that delivery information stored in the entry E02 is delivered. Meanwhile, in the delivery condition, a plurality of conditions (for example, male aged in his 30s) may be stored.

C-4. Sharing Process

Figure 15:
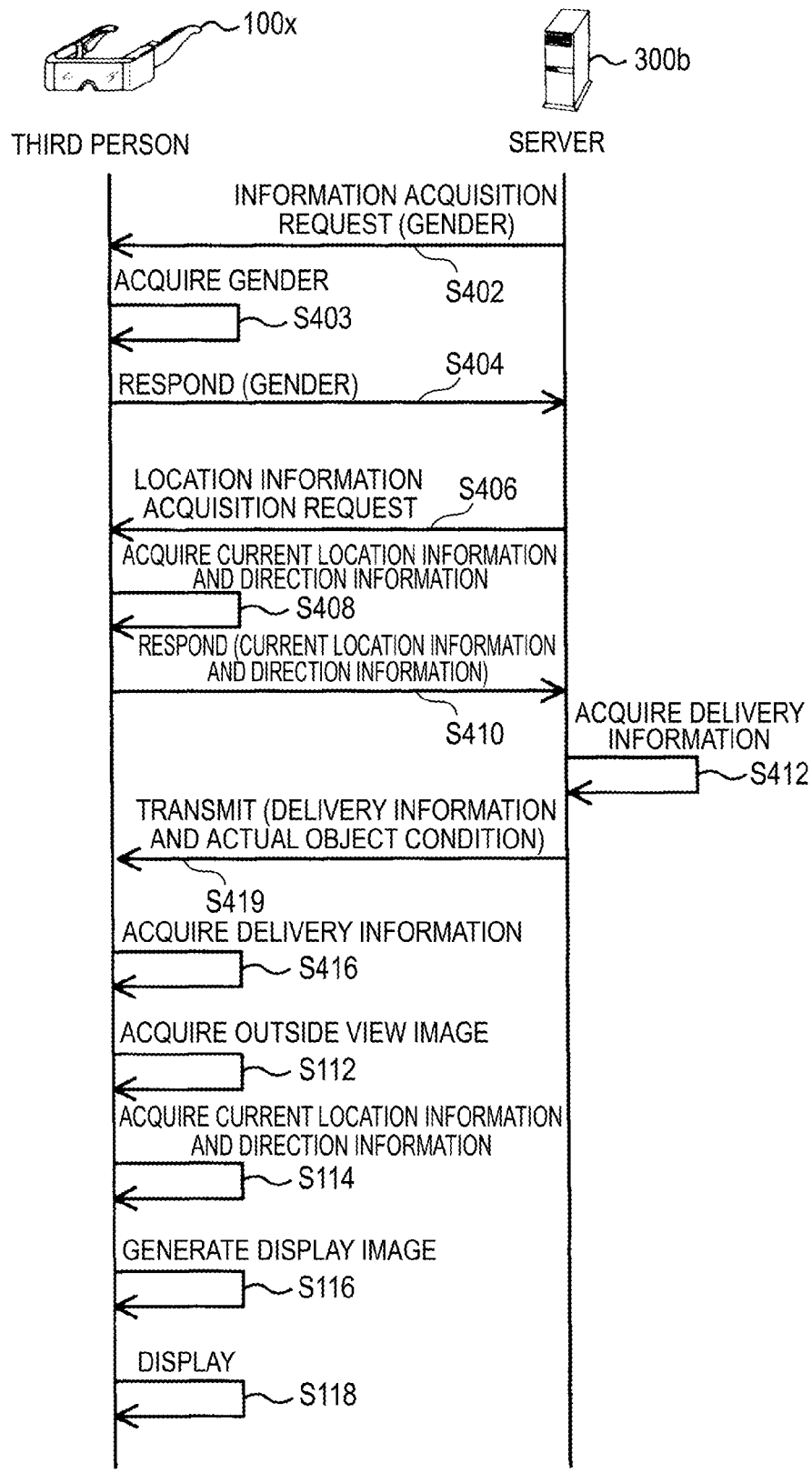
FIG. 15 is a sequence diagram illustrating the procedure of a sharing process according to a third embodiment.

FIG. 15 is a sequence diagram illustrating a procedure of the sharing process according to the third embodiment. In step S402, the control unit 319 of the server 300b broadcast-transmits a gender information acquisition request from a specified communication carrier which is determined in advance. If so, the HMD 100x, which is located in a range in which it is possible to receive radio waves from the specified communication carrier, can receive the gender information acquisition request from the server 300b. The reception-side acquisition unit 144 of the HMD 100x, which receives the information acquisition request, searches for the user information which is stored in the storage unit 120 and acquires the gender of the user in step S403. In step S404, the reception-side acquisition unit 144 transmits a response including the gender of the user to the server 300b.

In this manner, when the information acquisition request is broadcast-transmitted from the specified communication carrier, the server 300b can start a subsequent sequence only with the HMD 100x which is located in a specified place (that is, in a range, in which it is possible to perform communication, from the specified communication carrier or a radio wave reaching range in a case of wireless communication). In addition, if the broadcast-transmission is used, the server 300b may not know the address of the HMD 100x, that is, a network address.

When a plurality of conditions are acquired, the control unit 319 of the server 300b may repeat steps S402 to S404 a plurality of times. For example, when a gender and an age are acquired, the control unit 319 may transmit an age information acquisition request to the HMD 100x (step S402) again after the response (gender) of the HMD 100x in step S404 is acquired. The second and subsequent information acquisition requests may be broadcast-transmitted or unicasted to the HMD 100x which makes a response. In addition, the HMD 100x may refuse a response for a part or the whole of the information acquisition requests which are received from the server 300b. Setting of an information acquisition request to which the HMD 100x responds and an information acquisition request which is refused by the HMD 100x (for example, responds to a gender and an age and does not respond to a preference) may be performed in advance by the user and be stored in the storage unit 120.

In step S406, the control unit 319 of the server 300b transmits a location information acquisition request in unicast manner to the HMD 100x which makes a response. The reception-side acquisition unit 144 of the HMD 100x, which receives the location information acquisition request, acquires the current location information which is acquired by the GPS module 134 and the direction information which is acquired by the 9-axial sensor 66 in step S408. In step S410, the reception-side acquisition unit 144 transmits a response, which includes the current location information and the direction information, to the server 300b.

In step S412, the control unit 319 of the server 300b acquires delivery information from the delivery information 326. Specifically, the control unit 319 searches for the delivery information 326 using the condition, the current location information, and the direction information which are acquired in steps S404 and S410 as keys, and acquires the delivery information of an identical entry and an actual object condition which is a target to be superimposed on the delivery information. Meanwhile, when the control unit 319 acquires a plurality of conditions by repeating steps S402 to S404, the control unit 319 acquires all of the plurality of sets of delivery information and actual object conditions, which coincide with the plurality of conditions. In step S414, the control unit 319 transmits all of the sets of the delivery information and the actual object condition, which are acquired in step S412, to the HMD 100x.

After the delivery information is received, the processes which are the same as the processes described in steps S110 to S118 of FIG. 5 are performed in the HMD 100x. At this time, replacement below is performed.

The reception-side augmented reality processing unit 142 sets the target object in procedure b2 to "an actual object based on actual object condition acquired in step S414".

The reception-side augmented reality processing unit 142 uses the "delivery information acquired in step S414" as the virtual object of the procedure b4.

Figure 16:
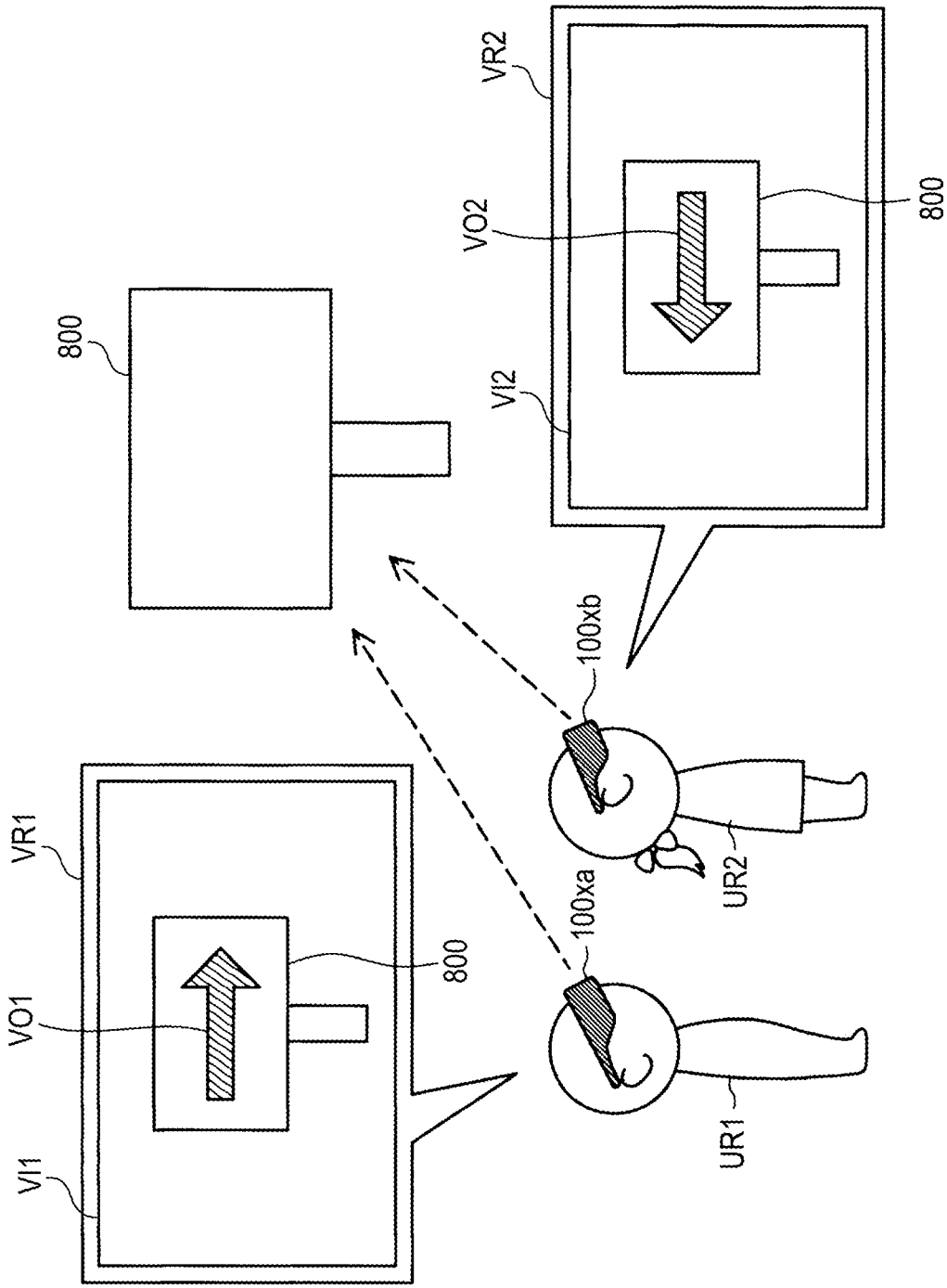
FIG. 16 is a diagram illustrating a result acquired when the sharing process according to the third embodiment is performed.

FIG. 16 is a diagram illustrating a result acquired when the sharing process is performed according to the third embodiment. In the example, it is assumed that the delivery condition is a gender, the location information is inside a predetermined range from a signboard 800, the direction information is the direction of the signboard 800, and the actual object condition is the signboard 800. As a result that the sharing process and the augmented reality process are performed in an HMD 100xa, a user UR1 (male) of the HMD 100xa can visually recognize the virtual image VI1 which indicates the virtual object VO1 of an arrow, which is superimposed on the signboard 800 which is a specified actual object, and faces the right direction, in the visible range VI1. In contrast, as a result that the sharing process and the augmented reality process are performed in an HMD 100xb, a user UR2 (female) of the HMD 100xb can visually recognize the virtual image VI2 which indicates the virtual object VO2 of an arrow, which is superimposed on the signboard 800 which is a specified actual object, and faces the left direction, in the visible range VR2.

Figure 17:
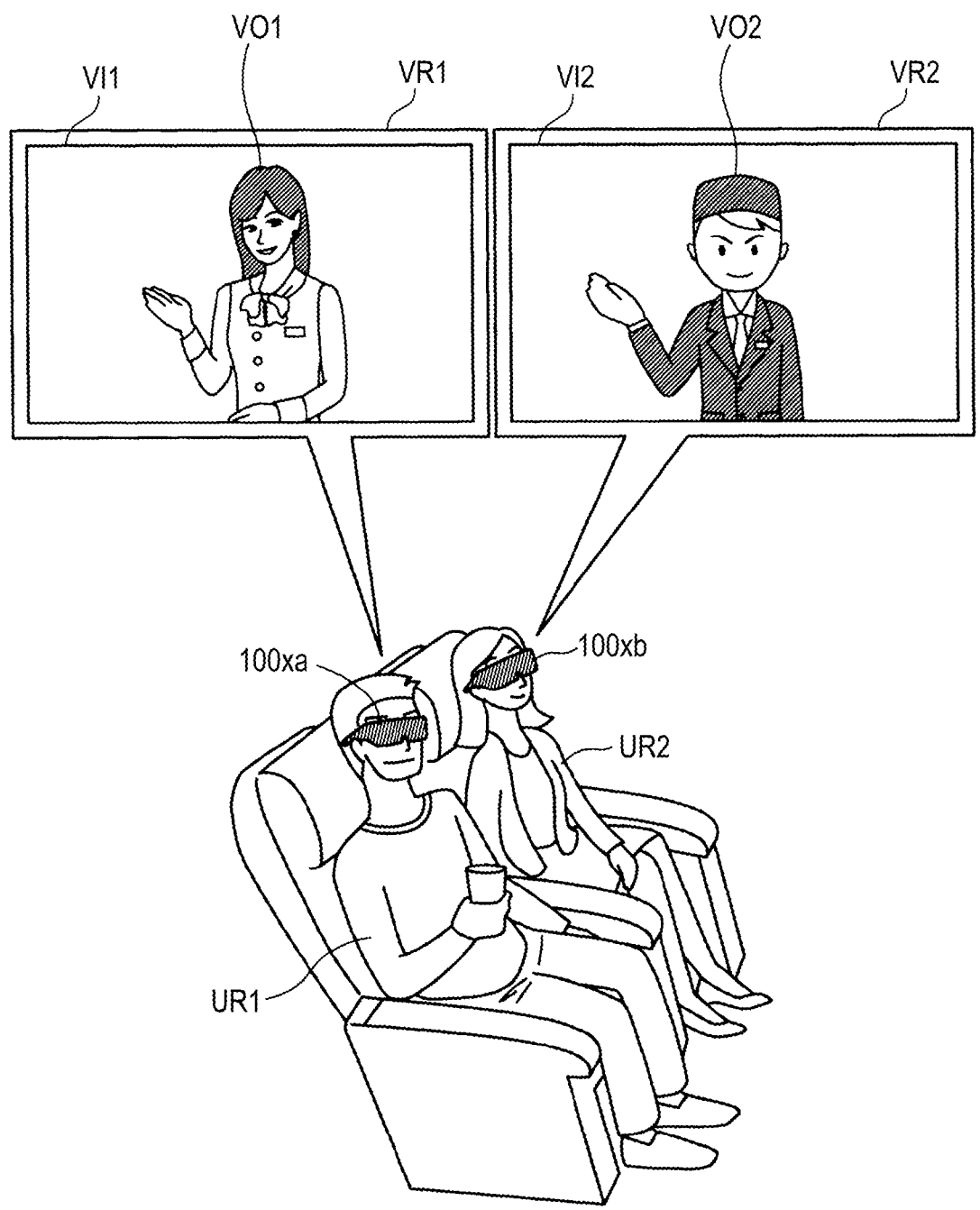
FIG. 17 is a diagram illustrating another result acquired when the sharing process according to the third embodiment is performed.

FIG. 17 is a diagram illustrating another result acquired when the sharing process according to the third embodiment is performed. In the example, it is assumed that the delivery condition is a gender, the location information is inside a vehicle, the direction information is a front direction (the progressing direction of a vehicle on which the user rides), and the actual object condition is a NULL value. As a result that the sharing process and the augmented reality process are performed in the HMD 100xa, the user UR1 (male) of the HMD 100xa can visually recognize the virtual image VI1 which indicates the virtual object VO1 of a female guide who is arranged in a default location (for example, center) in the visible range VI1. In contrast, a result that the sharing process and the augmented reality process are performed in the HMD 100xb, the user UR2 (female) of the HMD 100xb can visually recognize the virtual image VI2 which indicates the virtual object VO2 of a male guide who is arranged in the default location.

As above, according to the sharing process of the third embodiment, the control unit 319 transmits the delivery information according to at least any one of the information for the image display apparatus (HMD 100x) and the information for the user of the image display apparatus to the image display apparatus using the delivery information which is prepared in advance in the delivery information 326 of the storage unit 320. For example, when the display performance of the image display apparatus is employed as the delivery condition, the control unit 319 can select delivery information, which has a size, an aspect ratio, a transmittance, a tone, and the like that are suitable for the display performance of the image display apparatus, from the delivery information 326, and transmit the delivery information to the image display apparatus. When the delivery information is displayed in the image display apparatus which receives the delivery information, the user of the image display apparatus can visually recognize information for the image display apparatus or individual delivery information according to the information for the user. That is, users of respective image display apparatuses can visually recognize delivery information, which are different from each other, even when the same outside view is viewed at the same place. As a result, according to the information processing apparatus (server 300b) of the embodiment, it is possible to improve convenience for the user or an information provider who uses the information processing apparatus.

In addition, according to the sharing process (step S402) of the embodiment, the control unit 319 broadcast-transmits the information acquisition request from the specified communication carrier, and thus it is possible to transmit the delivery information with only the image display apparatus (HMD 100x) which is located at a specified place (that is, in a range in which communication from the specified communication carrier is possible). Further, the control unit 319 can successively acquire the information for the image display apparatus and the information for the user of the image display apparatus by repeating the transmission of the information acquisition request and reception of the response for the information acquisition request. Therefore, the control unit 319 can reduce the risk of information leakage when communicated content is leaked, compared to a case in which the information is acquired all at one time. In addition, according to the information processing apparatus (server 300b) of the embodiment, it is possible to reduce each information amount which is exchanged between the information processing apparatus and the image display apparatus, and thus it is possible to reduce processing loads for the information processing apparatus and the image display apparatus.

D. Fourth Embodiment

D-1. Configuration of Image Display System

In a fourth embodiment of the invention, similarly to the third embodiment, a configuration in which information of different display modes are shared between image display apparatuses and the display mode is changed according to a security level will be described. Hereinafter, only parts, in which configurations and operations are different from those of the third embodiment (FIGS. 13 to 17), will be described. Meanwhile, in the drawings, the reference symbols, which are the same as in the third embodiment described above, are attached to components which have the same configurations and operations as in the third embodiment, and the detailed description thereof will not be repeated. That is, configurations and operations which will be described below are the same as in the above-described third embodiment. An image display system according to the fourth embodiment is different from that of the third embodiment in that a server 300c is provided instead of the server 300b.

D-2. Configuration of HMD 100x

The configuration of the HMD 100x is almost the same as in the third embodiment. However, in the HMD 100x according to the fourth embodiment, the processing content of the reception-side augmented reality processing unit 142 in the sharing process is different from that of the third embodiment illustrated in FIG. 15.

D-3. Configuration of Server 300c

The configuration of the server 300c is almost the same as in the third embodiment illustrated in FIG. 13. However, in the server 300c, a part of the processing content of the control unit 319 in the sharing process is different from the third embodiment. In addition, in the storage unit 300 of the server 300c, the delivery information 326 which is the same as in the third embodiment (FIG. 14) is included. In the delivery information 326, an entry in which the delivery condition is set to the user identification information (information for uniquely identifying the user of the HMD 100x) is certainly stored. Further, processing information 322c and level information 328 are included in the server 300c.

Figure 18:
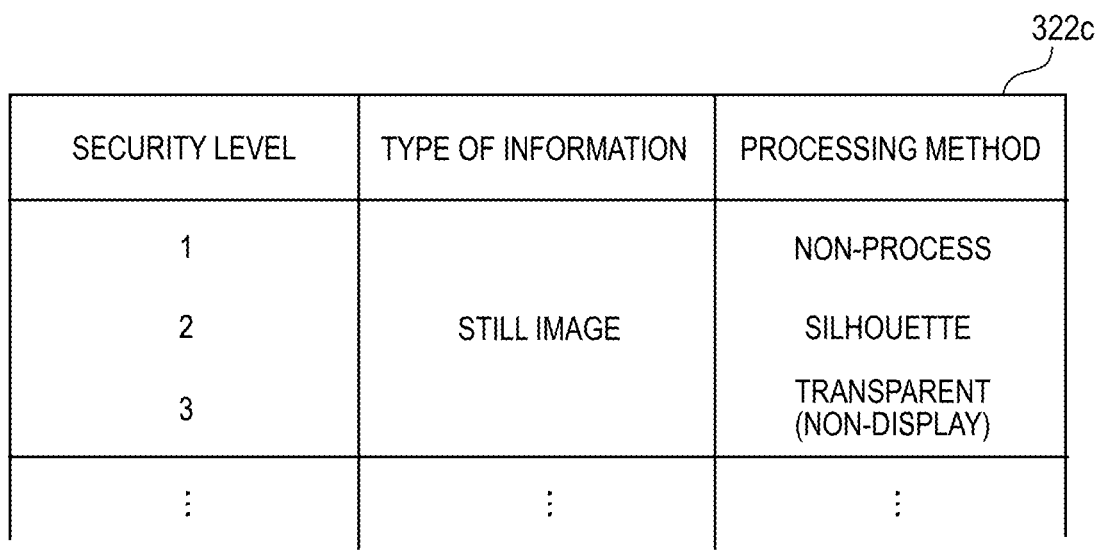
FIG. 18 is a diagram illustrating an example of processing information.

FIG. 18 is a diagram illustrating an example of the processing information 322c. The processing information 322c is information used when the delivery information which is delivered to the user of the HMD 100x is processed in the sharing process according to the fourth embodiment. In the processing information 322c, a security level, an information type, and a processing method are stored after being associated with each other. The "security level" includes a numerical value, a text string, and the like for designating the security level of the processed delivery information. In the example of FIG. 18, the detail, the clarity and the like of the information in the processed delivery information is reduced as the numerical value becomes large. The "information type" indicates a delivery information type. The "processing method" indicates a method for processing the delivery information in the sharing process. In the example of FIG. 18, it is understood that a process which is performed in the sharing process is a process which is not performed in a case of a still image and the security level "1", a process of being silhouetted in a case of a still image and the security level "2", a process of transparentizing in a case of a still image and a security level "3" (that is, be not displayed). As above, in the processing information 322c, a processing method for each combination of the information type and the security level is stored in advance.

Figure 19:
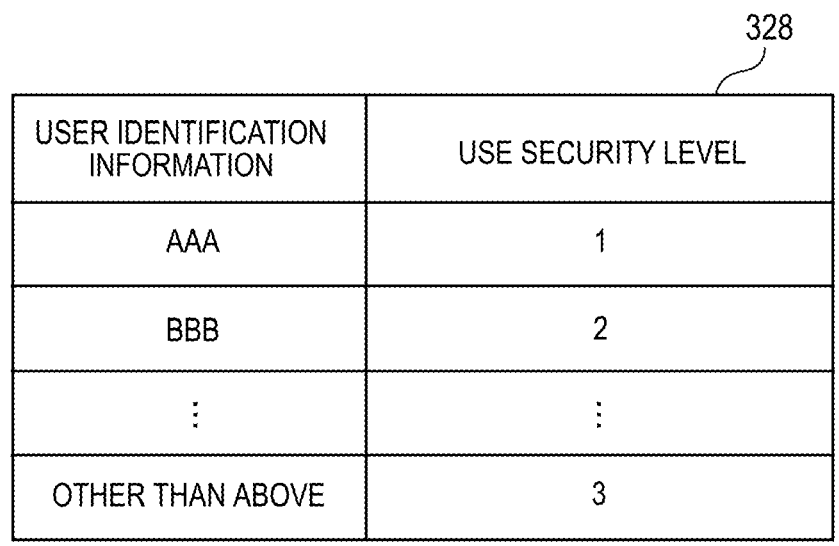
FIG. 19 is a diagram illustrating an example of level information.

FIG. 19 is a diagram illustrating an example of the level information 328. The level information 328 is information which is used when determining a security level used for each user of the HMD 100x in the sharing process according to the fourth embodiment. In the level information 328, user identification information and a use security level are stored after being associated with each other. The "user identification information" is information for uniquely identifying the user of the HMD 100x. In the example of FIG. 19, a security level "1" is used for a user corresponding to user identification information "AAA", a security level "2" is used for a user corresponding to user identification information "BBB", and a security level "3" is used for the other users (that is, identification information which is not registered in the user identification information of the level information 328).

D-4. Sharing Process

Figure 20:
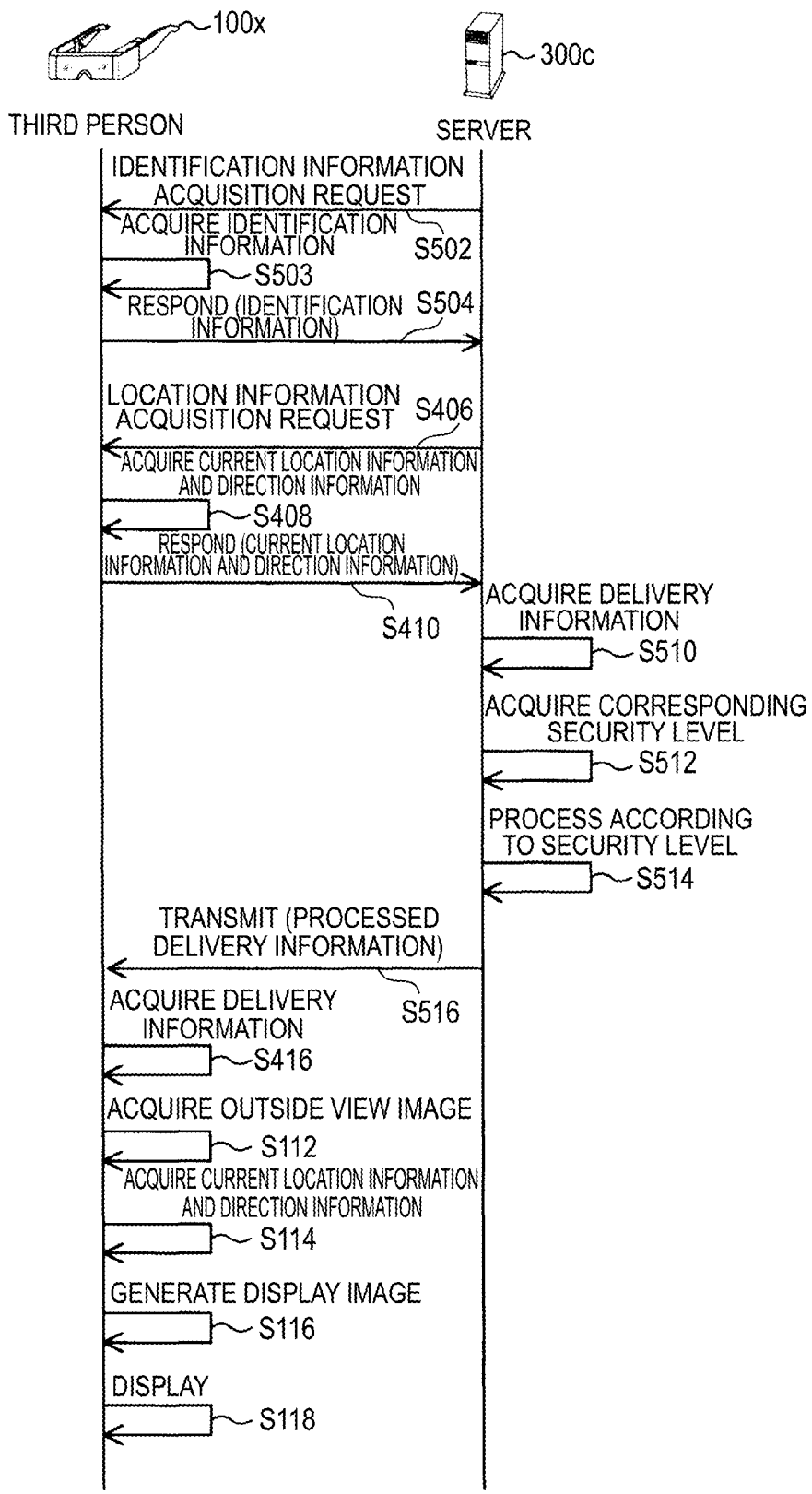
FIG. 20 is a sequence diagram illustrating the procedure of a sharing process according to a fourth embodiment.

FIG. 20 is a sequence diagram illustrating a procedure of the sharing process according to the fourth embodiment. Facts that steps S502 to S504 are included instead of steps S402 to S404 and steps S510 to S516 are included instead of steps S412 and S414 are different from the third embodiment illustrated in FIG. 15.

In step S502, the control unit 319 of the server 300c broadcast-transmits the identification information acquisition request from the specified communication carrier which is determined in advance. In the identification information acquisition request, information (for example, a command, a flag, or the like) which indicates that "it is difficult to refuse a response" is included. If so, the HMD 100x located in a range, in which it is possible to receive radio waves from the specified communication carrier, receives an identification information acquisition request from the server 300c. The reception-side acquisition unit 144 of the HMD 100x, which receives the identification information acquisition request, searches for user information which is stored in the storage unit 120 in step S503, and acquires information (identification information) for uniquely identifying the user. In step S504, the reception-side acquisition unit 144 transmits a response including the identification information to the server 300c.

As above, in the fourth embodiment, when the identification information acquisition request is broadcast-transmitted from the specified communication carrier in the same manner as in the third embodiment, the server 300c can perform subsequent sequences with only the HMD 100x which is located in a specified place (that is, in a range in which a radio wave from the specified communication carrier reaches). Meanwhile, after step S504 ends, the server 300c may acquire other conditions by performing steps S402 to S404 described in the third embodiment (FIG. 15).

In step S510, the control unit 319 of the server 300c acquires the delivery information from the delivery information 326. Specifically, the control unit 319 searches for the delivery information 326 using the current location information acquired in step S410 and the direction information as keys, and acquires the delivery information of a coinciding entry and an actual object condition which is a target on which the delivery information is superimposed. That is, the control unit 319 according to the embodiment acquires the delivery information that the current location information and the direction information coincide, regardless of the identification information of the user. Meanwhile, when the control unit 319 acquires another condition in step S404, the control unit 319 further searches for the delivery information 326 using another condition, the current location information, and the direction information as keys, and acquires the delivery information and the actual object condition of the coinciding entry.

In step S512, the control unit 319 of the server 300c acquires a security level corresponding to the user of the HMD 100x. Specifically, the control unit 319 searches for the level information 328 using the identification information acquired in step S504 as a key, and acquires a coinciding security level. In step S514, the control unit 319 processes the delivery information acquired in steps S510 according to the security level corresponding to the user of the HMD 100x. The details of the processing method are the same as in the first embodiment. In step S516, the control unit 319 transmits a set of the processed delivery information and the actual object condition to the HMD 100x.

After the delivery information is received, processes which are the same as the processes described in step S110 to S118 of FIG. 5 are performed in the HMD 100x. At this time, replacement below is performed.

The reception-side augmented reality processing unit 142 sets the target object in procedure b2 to an "an actual object based on the actual object condition acquired in step S516".

The reception-side augmented reality processing unit 142 uses the "processed delivery information acquired in step S516" as the virtual object of the procedure b4.

Figure 21:
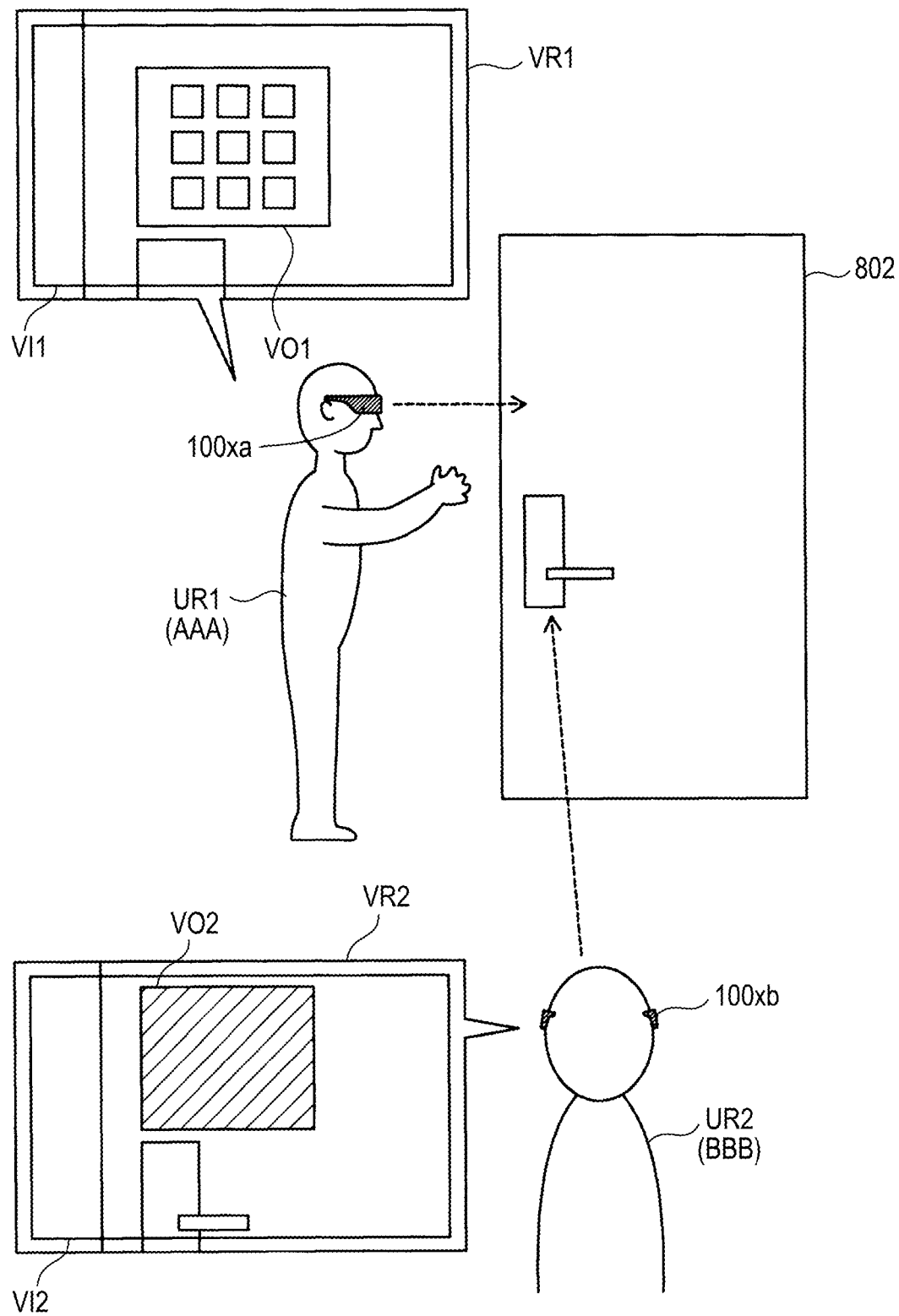
FIG. 21 is a diagram illustrating a result acquired when the sharing process according to the fourth embodiment is performed.

FIG. 21 is a diagram illustrating a result acquired when the sharing process is performed according to the fourth embodiment. In the example, it is assumed that a location information is inside of a predetermined range from the door 802, the direction information is the direction of a door 802, and an actual object condition is the predetermined location (knob information) of the door 802. As a result that the sharing process and the augmented reality process are performed in the HMD 100xa, the user UR1 having the identification information "AAA" can visually recognize the virtual image VI1, which indicates the virtual object VO1 of a unlocking manipulate panel superimposed on the predetermined location of the door 802, in the visible range VR1. In contrast, as a result that the sharing process and the augmented reality process are performed in the HMD 100xb, the user UR2 having the identification information "BBB" can visually recognize the virtual image VI2, which indicates the silhouetted virtual object VO2 of the panel superimposed on the predetermined location of the door 802, in the visible range VR2. In this manner, the virtual object VO2 expresses only the silhouette of the panel but the location, content, or the like of a button included in the unlocking manipulate panel do not appear.

Meanwhile, for example, when there is a further user having the identification information "CCC" in the scene illustrated in FIG. 21, the user is caused to visually recognize a virtual image which indicates a virtual object of a transparent panel. In other words, a user having the identification information CCC does not understand the existence of the panel (because it is transparent). The reason for this is that the use security level of the identification information "CCC" (in other cases) is "3" in the level information 328 (FIG. 19) and the processing method of the security level "3" is "transparent" in the processing information 322c (FIG. 18). In this manner, in the embodiment, when the "processing method" of the processing information 322c is appropriately changed, it is possible to freely change the display mode according to the security level. For example, in addition to being silhouetted and transparentized, it is possible to employ the change of permeability, the change of tone, forge (for example, a false panel in which the locations of buttons in the unlocking manipulate panel are randomly sorted), and the like.

As above, according to the sharing process of the fourth embodiment, it is possible to acquire the same advantage as that of the third embodiment. In addition, according to the sharing process of the embodiment, the control unit 319 processes the delivery information according to at least any one of the information for the image display apparatus (HMD 100x) and the information for the user of the image display apparatus, and transmits the processed delivery information to the image display apparatus as "the delivery information according to at least any one of the information". Therefore, for example, it is possible to prepare a plurality of delivery information according to at least any one of the information based on one piece of delivery information which is prepared in advance in the delivery information 326 of the storage unit 320, and thus it is possible to reduce the memory capacity of the delivery information in the storage unit 320.

E. Modification Example

In the above embodiments, a part of the configuration which is realized by hardware may be replaced by software. Conversely, a part of the configuration which is realized by software may be replaced by hardware. In addition, modifications as below are possible.

Modification Example 1

In the embodiment, the configuration of the image display system is exemplified. However, it is possible to arbitrary determine the configuration of the image display system in a range without departing from the gist of the invention and it is possible to, for example, add, remove, and convert the each of the components.

For example, it is possible to arbitrarily change the arrangement of the functional units in the image display system. For example, in the first embodiment, at least a part or all of the functional units (the acquisition unit, the processing unit, and the transmission unit), which are described as being included in the head mounted display (HMD 100), may be included in the image display apparatus (HMD 100x). In the same manner, in the second embodiment, at least a part or all of the functional units (the acquisition unit, the processing unit, and the transmission unit), which are described as being included in the information processing apparatus (server 300a) may be included in the head mounted display (HMD 100a) or the image display apparatus (projector 500). For example, when the processing unit is included in the image display apparatus, first variation is performed as followings. The head mounted display transmits all the display information, the processing method which is determined for each authority, the certification condition which is determined for each authority to the image display apparatus. In the image display apparatus, the image display apparatus may be certificated based on the received certification condition, the received display information may be processed and displayed using a processing method corresponding to authority in which certification is successful.

For example, as an example of the image display apparatus, the head mounted display (HMD 100x) is exemplified in the first embodiment and the projector is exemplified in the second embodiment. However, the projector may be used as the image display apparatus in the configuration of the first embodiment and the head mounted display may be used as the image display apparatus in the configuration of the second embodiment. In addition, the image display apparatus is not limited to the head mounted display or the projector. If an apparatus can display an image, it is possible to use various apparatuses. As the image display apparatus, for example, a personal computer, a smart phone, a television, a display apparatus, and the like may be used.

For example, any method may be used as a method of connecting respective apparatuses included in the image display system. Specifically, for example, the HMDs 100 and 100x according to the first embodiment may be connected through P2P. In addition, any method may be used as a method of performing communication between the respective apparatuses included in the image display system. Specifically, for example, the HMDs 100 and 100x according to the first embodiment may perform communication using a User Datagram Protocol (UDP), not communication using a Transmission Control Protocol (TCP).

For example, in the image display system described in the embodiment, an apparatus (hereinafter, referred to as an "intervening apparatus") other than the apparatuses described in the embodiment may be intervened between the respective apparatuses. In this case, for example, the intervening apparatus may temporarily accumulate information which is transmitted from the head mounted display (or the information processing apparatus), and the intervening apparatus may transmit the accumulated information to the image display apparatus. In the same manner, the intervening apparatus may temporarily accumulate information which is transmitted from the image display apparatus, and the intervening apparatus may transmit the accumulated information to the head mounted display (or the information processing apparatus). It is possible to use, for example, Network Attached Storage (NAS), an information processing apparatus, a personal computer, and the like as the intervening apparatus.

Modification Example 2

In the embodiment, the configuration of the HMD is exemplified. However, it is possible to arbitrarily determine the configuration of the HMD in a range which does not depart from the gist of the invention, and it is possible to, for example, add, remove, and convert each of the components.

The assignment of the components for the control unit and the image display unit in the embodiment is only an example, and various modes can be employed. For example, modes as below may be used.

(i) Mode in which the processing functions of the CPU, a memory, and the like are mounted on the control unit and only a display function is mounted on the image display unit (ii) Mode in which the processing functions of the CPU, a memory, and the like are mounted on both the control unit and the image display unit (iii) Mode in which the control unit and the image display unit are integrated (for example, mode in which the control unit is included in the image display unit and functions as a glasses-type wearable computer)

(iv) Mode in which a smart phone or a portable game console is used instead of the control unit (v) Mode in which the control unit is connected to the image display unit through a wireless signal transmission path, such as a wireless LAN, an infrared communication, or Bluetooth, and a connection unit (code) is eliminated. Meanwhile, in this case, electricity may be wirelessly supplied to the control unit or the image display unit For example, it is possible to arbitrarily change the configuration of the control unit which is exemplified in the embodiment. Specifically, for example, either the transmission unit (Tx) of the control unit or the reception unit (Rx) of the image display unit has a function which is capable of performing bidirectional communication and may function as a transceiver. For example, a part of the manipulation interfaces (various keys, track pads, or the like) included in the control unit may be omitted. For example, another manipulation interface, such as a manipulation stick, may be included in the control unit. For example, a configuration in which a device, such as a keyboard or a mouse, can be connected to the control unit may be provided and input may be received from the keyboard or the mouse. For example, each of the processing units (for example, the image processing unit, the display control unit, the augmented reality processing unit, and the like) which are included in the control unit may be configured using Application Specific Integrated Circuit (ASIC) which is designed in order to realize the functions. For example, although a secondary battery is equipped in the control unit as a power source, the power source is not limited to the secondary battery, and it is possible to use various batteries. For example, a primary battery, a fuel battery, a solar battery, a thermal battery, or the like may be used.

For example, it is possible to arbitrarily change the configuration of the image display unit which is exemplified in the embodiment. Specifically, for example, the image light generation unit of the image display unit may include components for realizing another method, together with the above-described components (the back light, the back light control unit, the LCD, and the LCD control unit) or instead of the above-described components. For example, the image light generation unit may include an organic Electro-Luminescence (EL) display and an organic EL control unit. For example, the image generation unit may include a digital-micro mirror device or the like instead of the LCD. For example, it is possible to apply the invention to a laser retina projection-type head mounted display.

Figure 22A:
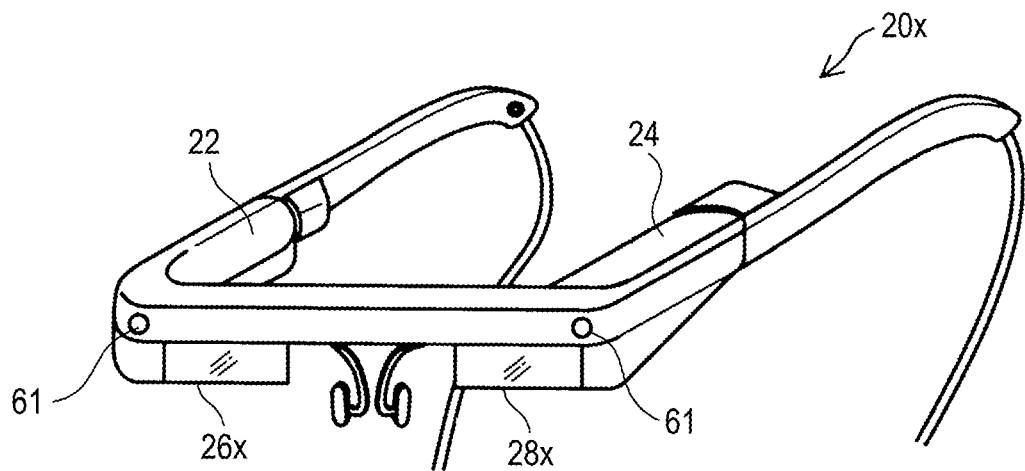
FIGS. 22A and 22B are explanatory diagrams illustrating the configuration of the external appearance of an HMD according to a modification example.
Figure 22B:
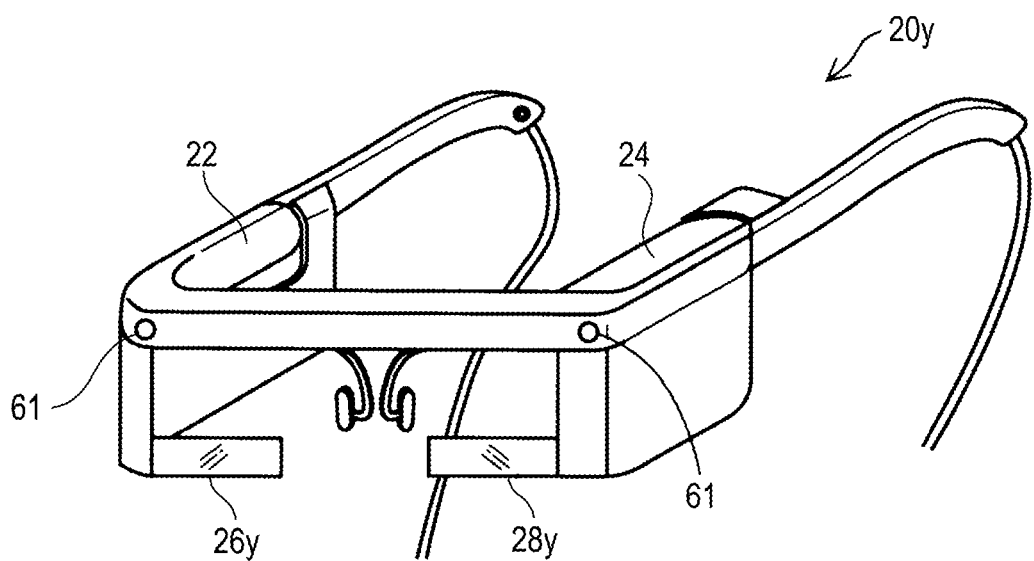

FIGS. 22A and 22B are explanatory diagrams illustrating the configuration of the external appearance of the HMD according to the modification example. An image display unit 20x in FIG. 22A includes a right optical image display unit 26x and a left optical image display unit 28x. The right optical image display unit 26x and the left optical image display unit 28x are formed to be small compared to the optical members of the embodiment, and are respectively arranged to the right and left eyes of the user diagonally upwards when wearing the HMD. An image display unit 20y in FIG. 22B includes a right optical image display unit 26y and a left optical image display unit 28y. The right optical image display unit 26y and the left optical image display unit 28y are formed to be small compared to the optical members of the embodiment, and are respectively arranged to the right and left eyes of the user diagonally downwards when wearing the HMD. In this manner, it is sufficient that the optical image display units are arranged in the vicinity of the eyes of the user. The sizes of the optical members which form the optical image display units are arbitrary, and a mode in which the optical image display units cover only parts of the eyes of the user, in other words, a mode in which the optical image display units do not completely cover the eyes of the user may be provided.

For example, although the HMD is a both-eye type transmission-type HMD, the HMD may be an ocellus type HMD. For example, the HMD may be configured as a non-transmission-type HMD, in which the transmission of an outside view is blocked in a state in which the user wears the HMD, or may be configured as a video see-through in which a camera is mounted on a non-transmission-type HMD. For example, an ear cover or ahead band-type earphone may be employed, or may be omitted. For example, instead of the image display unit which is worn as glasses, a normal planar display apparatus (a liquid crystal display apparatus, a plasma display apparatus, an organic EL display apparatus, or the like) may be employed. In this case, connection between the control unit and the image display unit may be performed in either wired or wireless manner. In this manner, it is possible to use the control unit as the remote controller of a normal planar display apparatus. For example, instead of the image display unit which is worn as glasses, for example, an image display unit in another form, such as an image display unit which is worn as a hat or an image display unit which is embedded in a body protector like a helmet, may be employed. For example, the image display unit may be configured as a vehicle, such as a car or an airplane, or a Head-Up Display (HUD), which is mounted on another traffic section.

For example, the gaze detection unit which is included in the HMD may detect a gaze using a method other than the infrared light receiving and emitting section.

Specifically, for example, it is possible to detect the gaze direction of the user of the HMD using at least one of ocular potential and a value detected by a gyro sensor.

Modification Example 3

In the embodiment, an example of the sharing process is illustrated. However, the procedure of the process illustrated in the embodiment is only an example, and various modifications are possible. For example, some steps may be omitted and other steps may be further added. The procedure of steps to be performed may be changed.

For example, in the sharing process illustrated in FIGS. 5 and 11, the acquisition and transmission of the current location information and the direction information may be omitted. In the same manner, in the sharing process illustrated in FIG. 8, the acquisition and transmission of the direction information may be omitted. If so, it is possible to simplify the content of the sharing process.

For example, in the sharing process illustrated in FIG. 5, non-processed display information may be transmitted from the head mounted display to the image display apparatus. In this case, in the image display apparatus, the processing and display of the display information may be performed. Further, in this case, the processing of the display information in the image display apparatus may be omitted and the same display information (display information on which processing is not performed) as in the head mounted display may be displayed in the image display apparatus. In addition, in the sharing process illustrated in FIGS. 8 and 11, the processed display information may be transmitted from the head mounted display to the information processing apparatus. In this case, the processing of the display information is not necessary in the information processing apparatus. In this manner, it is possible to reduce a risk of leakage of the information associated with transmission of the non-processed display information over a network. In addition, in the sharing process illustrated in FIGS. 8 and 11, the processing of the display information in the information processing apparatus may be omitted, and the same display information (display information on which processing is not performed) as in the head mounted display may be displayed in the image display apparatus.

For example, in the sharing process illustrated in FIG. 5, the transmission unit of the head mounted display may transmit the display information only when at least one of the predetermined conditions below is satisfied. In the same manner, the reception-side acquisition unit of the image display apparatus may acquire the display information (processed information or the like) only when at least one of the predetermined conditions below is satisfied.

In a case in which the image display apparatus is present in the visible range of the user of the head mounted display, it is possible to realize this through, for example, the image recognition of the outside view image.

In a case in which the distance between the image display apparatus and the head mounted display is included in a predetermined distance, the predetermined distance may be arbitrarily determined and can be set and changed by the user.

In a case in which the image display apparatus (or the user) has predetermined authority, it is possible to check whether or not the predetermined authority is included through certification using the image display apparatus identification information, the user identification information, a password which is determined in advance, or the like.

In a case in which the image display apparatus has predetermined performance, the predetermined performance may be arbitrarily determined, and may be set and changed by the user.

In a case in which the head mounted display has predetermined performance, the predetermined performance may be arbitrarily determined, and may be set and changed by the user.

In this manner, the transmission and reception of the display information are performed only when the predetermined condition is satisfied, and thus it is possible to reduce processing loads in the head mounted display and the image display apparatus.

Modification Example 4

In the embodiment, examples of the processing information, the user information, the delivery information, and the level information are illustrated. However, the configurations and content of the respective information illustrated in the embodiment are only examples, and various modifications are possible. For example, some configurations may be omitted and other configurations may be further added. The data stored in the guide information may be changed.

For example, the processing method in the above-described processing information is only an example, and it is possible to realize processing using various methods. Specifically, for example, when the type of the display information is sound, the specified image (for example, an image which indicates musical symbols) may be displayed instead of the replacement into alternative sound. In this manner, in the processing method, the type of the display information is changed.

Modification Example 5

The invention is not limited to the above-described embodiments, examples, and modification example, and can be realized using various configurations in a range without departing from the gist. For example, the technical characteristics of the embodiments, the examples, and the modification examples for technical characteristics of the respective forms disclosed in summary of the invention can be appropriately replaced or combined in order to solve a part or all of the problems or in order to accomplish a part or all of the advantages. In addition, when the technical characteristics are not described in the specification as essentials, it is possible to appropriately remove the technical characteristics.

The entire disclosure of Japanese Patent Application Nos. 2015-019989, filed Feb. 4, 2015 and 2015-238182, filed Dec. 7, 2015 are expressly incorporated by reference herein.

What is claimed is:

1. A head mounted display which enables a user to visually recognize a virtual image, the head mounted display comprising:
   an image display unit that causes the user to visually recognize the virtual image;
   a processing unit that processes display information, which is information displayed to the user as the virtual image, in the image display unit;
   a transmission unit that transmits the processed display information to an image display apparatus which is connected to the head mounted display; and
   an acquisition unit that acquires the display information, and
   a storage unit that stores the processed display information,
   wherein
      the acquisition unit acquires first current location information that indicates a current location of the head mounted display, together with the display information, and stores the acquired display information and the first current location information in the storage unit after associating the acquired display information with the first current location information, and
      the transmission unit further acquires from the image display apparatus second current location information which indicates a current location of the image display apparatus, acquires the display information in the head mounted display, which is present in a predetermined range of the image display apparatus, from the storage unit using the acquired second current location information and the first current location information in the storage unit, causes the processing unit to process the acquired display information, and transmits the processed display information to the image display apparatus.

2. The head mounted display according to claim 1,
wherein the processing unit changes a method of the process according to at least any one of a type of the display information and authority of the user of the image display apparatus.

3. The head mounted display according to claim 1,
wherein the transmission broadcast-transmits the processed display information.

4. The image display apparatus, which is connected to the head mounted display according to claim 1,
wherein the image display apparatus is another head mounted display that enables the user to visually recognize the virtual image, and
wherein the another head mounted display includes
a reception-side image display unit that causes the user to visually recognize the virtual image;
a reception-side acquisition unit that acquires the processed display information from the head mounted display; and
a reception-side augmented reality processing unit that forms the virtual image, which is used to cause the processed display information to be visually recognized, on the reception-side image display unit in the vicinity of the user of the head mounted display.

5. The image display apparatus which is connected to the head mounted display according to claim 1,
wherein the image display apparatus is a projector that acquires the processed display information from the head mounted display and that projects an image including the processed display information.

6. An information processing apparatus comprising:
an acquisition unit that acquires display information which is information displayed to a user of a head mounted display as a virtual image in the head mounted display which is connected to the information processing apparatus;
a processing unit that processes the acquired display information;
a transmission unit that transmits the processed display information to an image display apparatus which is connected to the information processing apparatus; and
a storage unit that stores the display information which is acquired from each of a plurality of head mounted displays,
wherein
the acquisition unit acquires first current location information that indicates a current location of the head mounted display, together with the display information, and stores the acquired display information and the first current location information in the storage unit after associating the acquired display information with the first current location information, and
the transmission unit further acquires from the image display apparatus second current location information which indicates a current location of the image display apparatus, acquires the display information in the head mounted display, which is present in a predetermined range of the image display apparatus, from the storage unit using the acquired second current location information and the first current location information in the storage unit, causes the processing unit to process the acquired display information, and transmits the processed display information to the image display apparatus.

7. The information processing apparatus according to claim 6,
wherein the processing unit changes a method of the process according to at least any one of a type of the display information and authority of the user of the image display apparatus.

8. The image display apparatus, which is connected to the information processing apparatus according to claim 6,
wherein the image display apparatus is another head mounted display that enables the user to visually recognize the virtual image, and
wherein the another head mounted display includes:
a reception-side image display unit that causes the user to visually recognize the virtual image;
a reception-side acquisition unit that acquires the processed display information from the information processing apparatus; and
a reception-side augmented reality processing unit that forms the virtual image, which is used to cause the processed display information to be visually recognized, on the reception-side image display unit in the vicinity of the user of the head mounted display.

9. The information processing apparatus according to claim 6,
wherein the acquisition unit acquires a scene image, which includes the user of the head mounted display, together with the display information,
wherein the processing unit further composes the acquired scene image with the processed display information, and
wherein the transmission unit transmits the display information acquired after composition to the image display apparatus as the processed display information.

10. The image display apparatus which is connected to the information processing apparatus according to claim 9,
wherein the image display apparatus is a projector that acquires the processed display information from the information processing apparatus and that projects an image including the processed display information.

11. The information processing apparatus according to claim 6, further comprising:
a control unit,
wherein
the storage unit stores delivery information to be delivered to the image display apparatus, and
the control unit transmits the delivery information to the image display apparatus according to at least any one of information for the image display apparatus and information for a user of the image display apparatus.

12. The information processing apparatus according to claim 11,
wherein the control unit processes the delivery information in the storage unit according to at least any one of the information, and transmits the processed delivery information as the delivery information to the image display apparatus.

13. The information processing apparatus according to claim 11,
wherein the control unit further broadcast-transmits an information acquisition request for acquiring at least any one of the information from the specified communication carrier, and transmits the delivery information to the image display apparatus which responds to the information acquisition request.

14. The information processing apparatus according to claim 13,
wherein the control unit acquires at least any one of the information by repeating transmission of the information acquisition request and reception of the response for the information acquisition request between the control unit and the image display apparatus which responds to the information acquisition request.

15. The information processing apparatus according to claim 14,
wherein the information acquisition request includes information for identifying whether or not it is possible to refuse a response on a side of the image display apparatus.

16. An image display system comprising:
the information processing apparatus according to claim 11; and
a head mounted display,
wherein the head mounted display includes
a reception-side image display unit that causes the user to visually recognize the virtual image;
a reception-side acquisition unit that acquires the delivery information from the information processing apparatus; and
a reception-side augmented reality processing unit that forms the virtual image, which indicates the acquired delivery information, on the reception-side image display unit.

17. The image display apparatus which is connected to the information processing apparatus according to claim 11,
wherein the image display apparatus is a head mounted display that enables the user to visually recognize the virtual image, and
wherein the head mounted display includes
a reception-side image display unit that causes the user to visually recognize the virtual image;
a reception-side acquisition unit that acquires the delivery information from the information processing apparatus; and
a reception-side augmented reality processing unit that forms the virtual image, which indicates the acquired delivery information, on the reception-side image display unit.

18. An image display system comprising:
a head mounted display;
the information processing apparatus according to claim 6; and
a projector,
wherein the projector acquires the processed display information from the information processing apparatus, and projects an image including the processed display information.

19. An image display system comprising:
a head mounted display;
the information processing apparatus according to claim 6; and
another head mounted display,
wherein the another head mounted display includes
a reception-side image display unit that causes the user to visually recognize the virtual image;
a reception-side acquisition unit that acquires the processed display information from the information processing apparatus; and
a reception-side augmented reality processing unit that forms the virtual image, which is used to cause the processed display information to be visually recognized, on the reception-side image display unit in the vicinity of the user of the head mounted display.

20. A method for sharing display of a head mounted display, comprising:
(a) displaying display information to a user of the head mounted display as a virtual image;
(b) acquiring first current location information that indicates a current location of the head mounted display;
(c) acquiring from an image display apparatus second current location information which indicates a current location of the image display apparatus;
(d) acquiring, using the acquired second current location information and the first current location information, the display information displayed to a user of the head mounted display, which is present in a predetermined range of the image display apparatus;
(e) processing the display information; and
(f) transmitting the processed display information to the image display apparatus.

21. A non-transitory computer-readable storage medium comprising a program configured to cause a computer to execute the method according to claim 20.

* * * * *